United States Patent [19]
Ando et al.

[11] Patent Number: 5,719,855
[45] Date of Patent: Feb. 17, 1998

[54] DIGITAL TELEPHONE SWITCHING SYSTEM HAVING PLURAL TERMINAL DEVICES DIRECTLY CONNECTED TO A COMMON DIGITAL LINE

[75] Inventors: Tatsuhiko Ando; Yuji Kobayashi; Masumi Kumakura, all of Fukushima-ken, Japan

[73] Assignee: Hitachi Telecom Technologies, Ltd., Koriyama, Japan

[21] Appl. No.: 583,943

[22] Filed: Jan. 11, 1996

Related U.S. Application Data

[63] Continuation of Ser. No. 253,266, Jun. 2, 1994, abandoned.

[30] Foreign Application Priority Data

Jun. 3, 1993 [JP] Japan ................................. 5-157944

[51] Int. Cl.[6] ...................................................... H04J 3/12
[52] U.S. Cl. ........................ 370/280; 370/421; 370/524
[58] Field of Search .................................. 370/110.1, 112, 370/85.1, 95.1, 100.1, 68.1, 66, 67, 29, 521, 522, 523, 524, 276, 280, 420, 421; 379/230

[56] References Cited

U.S. PATENT DOCUMENTS

| 4,592,047 | 5/1986 | Fundneider | 370/110.1 |
| 4,635,255 | 1/1987 | Clark et al. | 370/110.1 |
| 4,689,789 | 8/1987 | Herger | 370/110.1 |
| 4,792,800 | 12/1988 | Fujioka et al. | 370/110.1 |
| 4,835,769 | 5/1989 | Donaghue et al. | 370/110.1 |
| 4,999,836 | 3/1991 | Fujiwara | 370/110.1 |
| 5,166,971 | 11/1992 | Vollert | 379/88 |
| 5,204,860 | 4/1993 | Sparks | 370/110.1 |
| 5,309,440 | 5/1994 | Nakamura et al. | 370/105.1 |

Primary Examiner—Chau Nguyen
Attorney, Agent, or Firm—Antonelli, Terry, Stout, & Kraus, LLP

[57] ABSTRACT

A plurality of digital telephones 2A, 2B are provided in direct multiple connection with a digital line 4 introduced from a private branch exchanging system. Each of the digital telephones 2A, 2B sends a burst signal containing its own telephone call data, and burst signals from the telephones 2A, 2B are combined into a single burst signal on the digital line 4 to transmit communication data of the telephones 2A, 2B in the form of the single burst signal to the private branch exchanger 1.

8 Claims, 26 Drawing Sheets

FIG. 2

| ITEM | CONTENT | |
|---|---|---|
| TRANSMISSION BEARER RATE | 512kbps | |
| TRANSMISSION CAPACITY | AUDIO & DATA CHANNEL | 64kbps x 2 CHANNELS |
| | CONTROL INFORMATION | 16kbpS |
| BURST SYNCHRONIZATION | 125µs | |
| TRANSMISSION CODE | AMI CODE | |
| METHOD FOR SYNCHRONIZATION | START-STOP SYNCHRONISM USING START BITS | |

EXAMLE OF AMI CODING
(RECEIVED WAVEFORM)

| ABBREVIATION | CONTENT | NOTE |
|---|---|---|
| F | START BIT (FRAME SYNCHRONIZATION) | ALWAYS "00" |
| B1 | B1 CHANNEL (64kbps) | ALL "1" DURING NO CALL |
| B2 | B2 CHANNEL (64 kbps) | |
| MF | MF BIT | ALWAYS "0" |
| D | D CHANNEL DATA (16kbps) | |
| P | PARITY (ODD) | REMOVAL OF D.C.COMPONENT |

FIG. 13
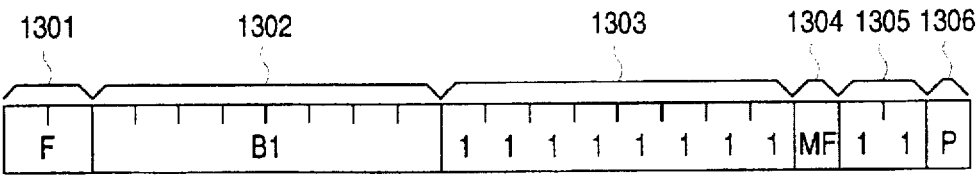
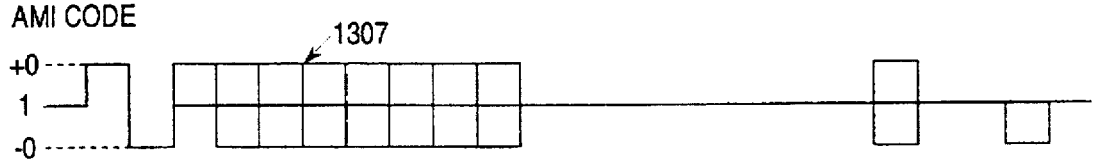
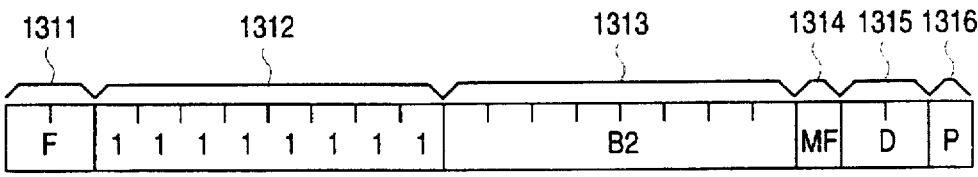
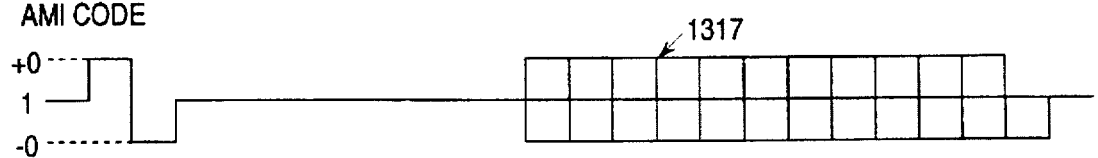
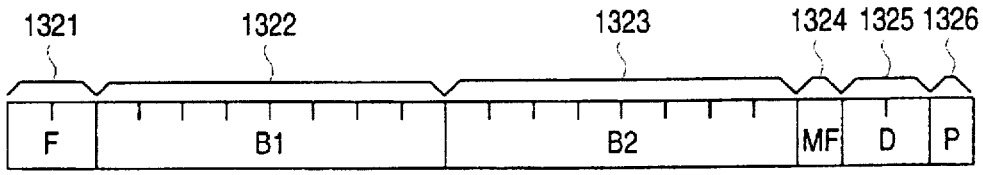
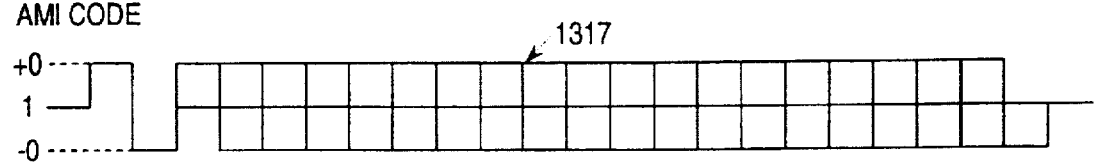

| ℓ | | m, n |
|---|---|---|
| RESISTANCE | LENGTH OF LINE | LENGTH OF LINE |
| 20Ω | 110m (φ0.5) | 10m |

DIGITAL TELEPHONE SWITCHING SYSTEM HAVING PLURAL TERMINAL DEVICES DIRECTLY CONNECTED TO A COMMON DIGITAL LINE

This application is a continuation application of Ser. No. 08/253,266, filed Jun. 2, 1994, now abandoned.

BACKGROUND OF THE INVENTION

1. Field of the Invention

This invention relates to a system for digital transmission between a branch exchanging system such as a private branch exchanging system, a button telephone apparatus, etc. and digital telephones involved in the branch exchanging system.

2. Description of the Prior Art

There has been used a system in which a plurality of analog telephones are put in multiple connection (in a branch connection) with a single analog extension circuit in a branch exchanging system such that the analog telephones share a single two-wire analog line. With this system, however, two or more telephones sharing a single extension circuit are not permitted to take communication with different destinations concurrently. With regard to digital telephones, two or more telephones cannot be provided in multiple connection with a single digital extension line in a branch exchanging system. That is, one digital extension line and one digital telephone have the one-to-one correspondence for delivery of information therebetween, and digital extension lines as many as digital telephones are required.

There has also been used a multiplexed transmission system in which a multiplexer involves by a plurality of terminal devices to multiplex digital data from two or more of the terminal devices into a digital data such that these terminal devices can take communication with different destinations, respectively.

As noted above, the conventional technique could not directly connect a plurality of digital telephones in multiple connection with a single digital extension circuit (a single digital line) of a branch exchanging system, and a multiplexer must be used to multiplex a plurality of digital data on a single digital line. Such a multiplexer, if provided in a digital extension of a branch exchanging system, complicates the arrangement of the system and increases its cost.

OBJECT OF THE INVENTION

It is therefore an object of the invention to provide a digital transmission system in which a plurality of digital telephones can be multiple-connected with a single digital extension circuit of a branch exchanging system, without using a multiplexer.

SUMMARY OF THE INVENTION

According to the invention, there is provided a digital transmission system comprising a main unit, at least one digital line extended from the main unit, and a plurality of terminal devices in direct multiple connection with the digital line, in which burst signals containing telephone call information are released to the digital line from the respective terminal devices at a predetermined timing and are composed into a single burst signal on the digital line such that the main unit receives the single burst signal on the digital line.

This arrangement enables direct multiple connection of a plurality of digital telephones to a single digital extension circuit in the branch exchanging system without using a multiplexer, and permits two or more digital telephones to be connected concurrently with different destinations.

BRIEF DESCRIPTION OF THE DRAWING

FIG. 2 shows a specification for interface of a digital line in the present invention;

FIG. 13 is a diagram explaining composition of burst signals sent from two digital telephones onto the digital line;

DETAILED DESCRIPTION OF THE PREFERRED EMBODIMENTS

The invention is explained below in detail with reference to the drawings.

Figure 1:
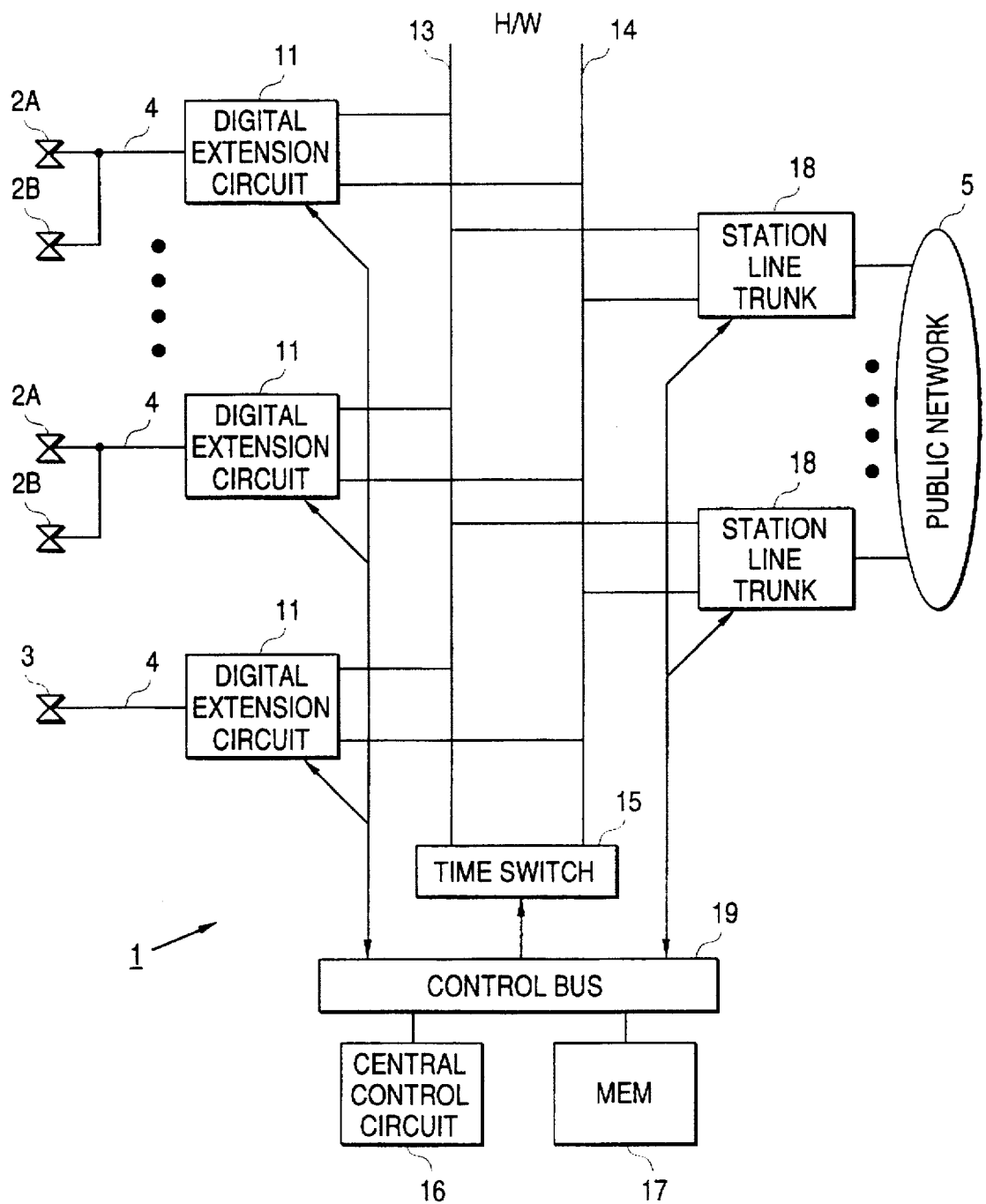
FIG. 1 is a diagram showing a general arrangement of a private branch exchanging system according to the present invention.

FIG. 1 is a diagram showing a general arrangement of a branch exchanging system according to the invention. In FIG. 1, a private branch exchanger (PBX) 1 including a time switch 15 is provided. Extended from the time switch 15 are an incoming highway 13 and an outgoing highway 14 such that digital information is switched by the time switch 15, the incoming highway 13 and the outgoing highway 14 at the speed of 64 kbps. Connected to the incoming highway 13 and the outgoing highway 14 are digital extension circuits (LIN) 11 for controlling digital telephones 2A, 2B, 3 and station line trunks (COT) 18 behaving as an interface with a public network 5 such that telephone calls are interconnected among them. A central control unit 16 controls the entire operations of the branch exchanger 1 including interconnection of calls on the basis of a control program, station data, a control table, etc. stored in memory 17. Therefore, the time switch 15, the digital line circuits 11 and the station line trunks 18 are held in logic connection with the central control unit 16 and behave under the control of the central control unit 16. A control bus 19 transmits control data among the central control unit 16, memory 17, time switch 15, digital extension circuits 11 and station line trunks 18.

The digital telephones 2A and 2B are multi-connected to one of digital lines 4 made of a two-wire cable, that is, two digital telephones are connected to one of digital extension circuits 11 of the branch exchanger 1. The digital telephones 2A, 2B can concurrently communicate with different destinations.

FIG. 2 is a diagram for explaining the specification required for transmission between the digital extension circuit 11 and the digital telephones 2A, 2B. In FIG. 2, the transmission bearer rate is 512 kbps, and the channel arrangement is 2B+D (B1+B2+D) including two so-called B channels for use in transmission of audio or data information (telephone call data) having the transmission capacity of 64 kbps and one so-called D channel for use in transmission of control information having the transmission capacity of 16 kbps. Therefore, the total transmission capacity results in 144 kbps. The burst synchronization is 125 μs, the transmission codes are AMI codes, and the method for synchronization is a start-stop synchronism using start bits. Used as the transmission system is a Ping Pong transmission method.

Figures 3, 4:
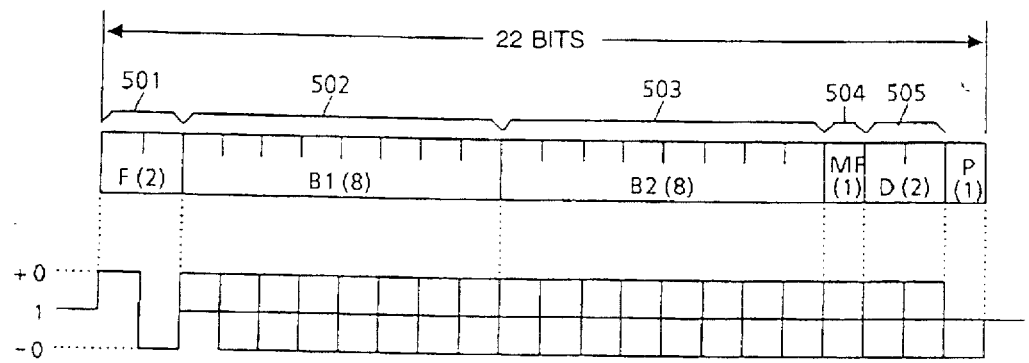
FIG. 3 is a diagram showing arrangements of a burst signal transmitted by the digital line.
FIG. 4 is an explanation of the content of the burst signal shown in FIG. 3.

FIG. 3 is a diagram showing an arrangement of a burst signal transmitted between the digital extension circuit 11 and the digital telephones 2A, 2B, and FIG. 4 explains the content of the burst signal shown in FIG. 3. In FIGS. 3 and 4, a single burst signal includes a frame bit (two bits) 501 always representing "00", B1 channel data (eight bits) 502, B2 channel data (eight bits) 503, MF bit 504 used for removing d.c. components and always representing "0", D channel data (two bits) 505, and parity bit (one bit).

Figure 5:
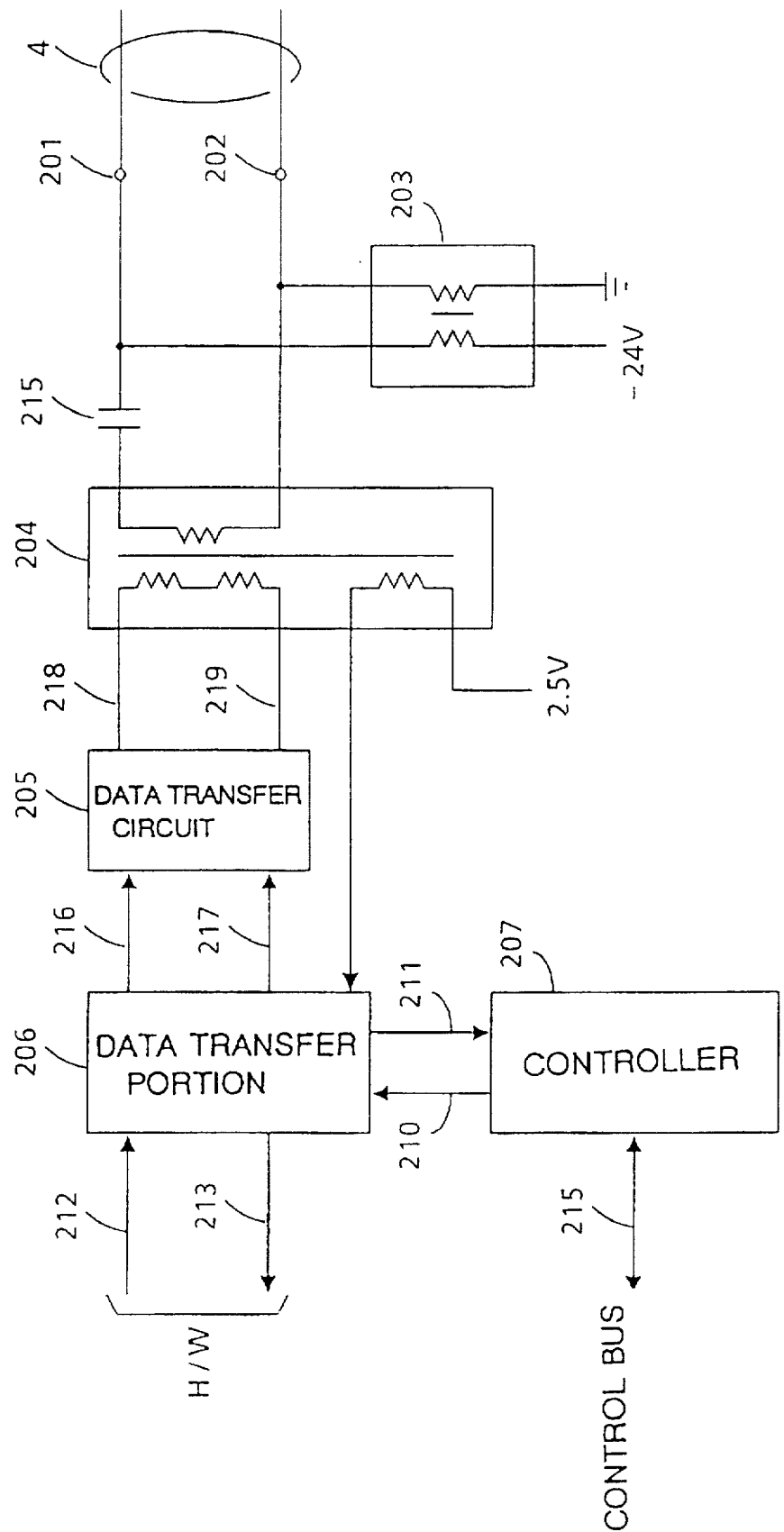
FIG. 5 is a block diagram of a digital extension circuit in the present invention.

FIG. 5 is a block diagram showing an arrangement of the digital extension circuit 11. In FIG. 5, the digital extension circuit 11 includes a controller 207; a data transfer portion 206 connected to the controller 207 by signal lines 210 and 211; a data transfer circuit 205 connected to the data transfer portion 206 by signal lines 216 and 217; line terminals 201 and 202; a transformer 204 connected to the line terminals 201, 201, data transfer circuit 205 and data transfer portion 206; a capacitor 215; and a choke coil 203.

The controller 207 transmits control information between PBX 1 and the central control unit 16 through a signal line 214 to control the digital telephone. Namely, the controller 207 transfers control information from the central control unit 16; sends it as D channel data to the data transfer portion 206 through the signal line 210 at the speed of 16 kbps; receives D channel data from the data transfer portion 206 having the speed of 16 kbps through the signal line 211; and sends the received D channel data as control information to the central control unit 16.

The data transfer portion 206 provides a two-wire time-divisional Ping Pong transmission system having the line bit rate of 512 kbps to perform bi-directional communication of 144 kbps (2B+D) by using a twisted pair wire. More specifically, the data transfer portion 206 generates an outgoing burst signal shown in FIG. 3 from call data (of the B1 and B2 channels) received from the outgoing highway 14 of PBX 1 via a signal line 212 and the control information received from the controller 207 via the signal line 210, and releases it onto the signal lines 216, 217. If the outgoing data to be transmitted represents the "0" level, then "1" level signals are output from the signal lines 216 and 217; however, the outputs are permitted to go alternately from the signal lines 216 and 217. On the other hand, the data transfer portion 206 outputs call data (of the B1 and B2 channels) contained in a received burst signal obtained through a signal line 220 to the incoming highway 13 of PBX 1 via the signal line 213, and outputs control information (of the D channel) contained in the call data to the controller 207 via the signal line 211 at the speed of 16 kbps.

The data transfer circuit 205 power-amplifies the burst signal received from the data transfer portion 206 and gives it to the transformer 204. The burst signal is AMI-coded by signals from the signal lines 218, 219 and by the transformer 204, and released onto the digital line 4.

A power source (-24V) is connected to respective lines of the digital line 4 coupled to the line terminals 201 and 202 via the choke coil 203 so as to supply the digital telephones 2A, 2B with a d.c. current without attenuating data transmission signals. In order to cut off a d.c. current of the digital line 4, the capacitor 215 is connected in series to a line-side terminal of the transformer 204 which insulates the burst signal from the digital line 4 to ensure balanced transmission thereof.

Figure 6:
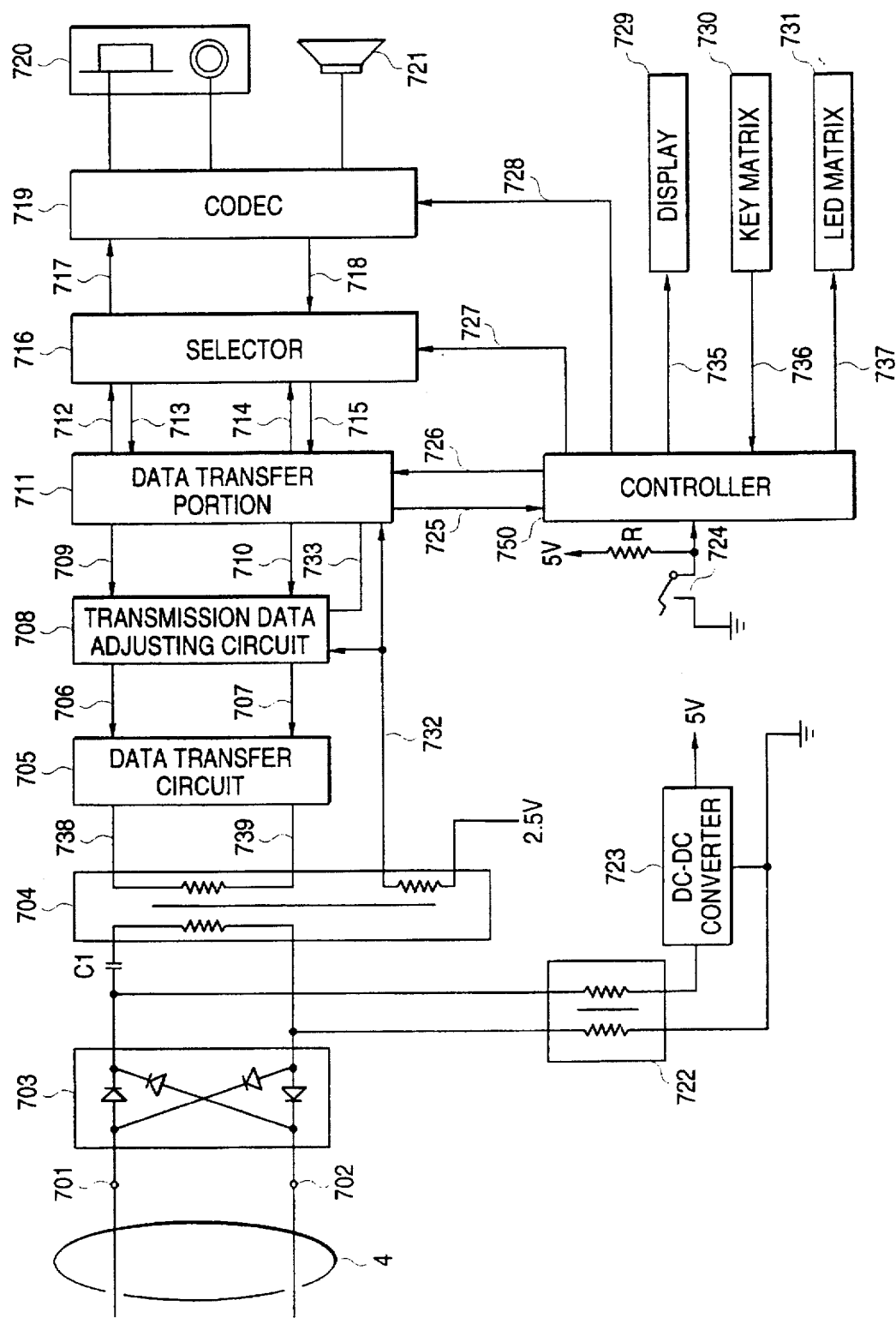
FIG. 6 is a block diagram of a digital telephone used in the present invention.

FIG. 6 is a block diagram showing an arrangement of the digital telephones 2A, 2B. In FIG. 6, each of the digital telephones 2A, 2B includes a handset 720; a speaker 721; a CODEC 719 coupled to a speaker 721 and the handset 720; a selector 716 coupled to the CODEC 719 by signal lines 717, 718; a data transfer portion 711 coupled to the selector 716 by signal lines 712, 713, 714, 715; a transmission data adjusting circuit 708 coupled to the data transfer portion 711 by signal lines 709, 710, 733; a data transfer circuit 705 coupled to the transmission data adjusting circuit 708 by signal lines 706, 707; a transformer 704 coupled to the data transfer circuit 705 by signal lines 738, 739 and coupled to the transmission data adjusting circuit 708 and to the data transfer portion 711 by a signal line 732; line terminals 701, 702; a diode bridge 703 coupled to the transformer 704, line terminals 701 and 702; a capacitor C1; a choke coil 722; a DC-DC converter 723; a switch 724; a display 729; a key matrix 730; an LED matrix 731; and a controller 750 for controlling the CODEC 719, selector 716, switch 724, display 729, key matrix 730 and LED matrix 731 and coupled to the data transfer portion 711 by signal lines 725, 726.

The line terminals 701, 702 are coupled to one of the digital extension circuits 11 to behave as connection terminals for transmitting and receiving burst signals and for receiving a power supply.

The CODEC 719 receives from the signal line 717 continuous supply of PCM-coded 8-bit serial audio data at the speed of 64 kbps; converts the audio data to an analog signal (audio signal); sends the analog signal to the receiver of the handset 720 or the speaker 721 chosen under control of the controller 750; makes a PCM code from an analog signal (audio signal) from the transmitter of the handset 720; and continuously outputs the PCM-coded audio data in the form of 8-bit serial data of 64 kbps to the signal line 718.

The selector 716 is controlled by the controller 750 via the signal line 727 to selectively establish one of two different aspects of connection, one of which connects the signal line 713 for input of the B1 channel to the data transfer portion 711 with the signal line 718 and connects the signal line 712 for output of the B1 channel from the data transfer portion 711 with the signal line 717, and the other of which connects the signal line 715 for input of the B2 channel to the data transfer portion 711 with the signal line 718 and connects the signal line 714 for output of the B2 channel from the data transfer portion 711 with the signal line 717.

The controller 750 receives through the signal line 725 control information of the D channel received by the data transfer portion 711, then makes an analysis thereof, and controls the display 729, LED matrix 731 and CODEC 719. The controller 750 also controls the selector 716 by reading a preset status of the switch 724, and instructs it to connect the signal line 713 for input of the B1 channel to the data transfer portion 711 with the signal line 718 and connect the signal line 712 for output of the B1 channel from the data transfer portion 711, or alternatively, to connect the signal line 715 for input of the B2 channel to the data transfer portion 711 with the signal line 718 and connect the signal line 714 for output of the B2 channel from the data transfer portion 711 with the signal line 717. The controller 750 also reads key data entered through the key matrix 730 by an operator, makes an analysis thereof to generate control information to be sent to PBX 1, and outputs the control information as 2-bit serial data to the signal line 726 at the speed of 16 kbps.

The data transfer portion 711 provides a two-wire time-divisional Ping Pong transmission system having the line bit rate of 512 kbps to perform bi-directional communication of 144 kbps (2B+D) by using a twisted-pair wire. More specifically, the data transfer portion 711 generates an outgoing burst signal from B1 channel call data coming from the signal line 713, B2 channel call data coming from the signal line 715 and control signal (D channel data) coming from the signal line 726, and sends it as a train of pulses to the output lines 709, 710. If the outgoing data represents the "0" level, then "1" level signals are output from the signal lines 709, 710; however, the outputs are permitted to go alternately from the signal lines 709, 710. Then, the output is supplied to the output lines 706, 707 via a transmission data adjusting circuit 708, referred to later, such that the data transfer circuit 705 and the transformer 704, referred to later, make an AMI-coded burst signal. The burst signal is then transmitted to the digital extension circuit 11 through the diode bridge 703 and via the digital line 4 by generating a transmission voltage between the line terminals 701, 702.

The data transfer portion 711 receives an AMI-coded burst signal coming from the digital extension circuit 11 through the transformer 704 and the signal line 732; separates the burst signal into B1 channel call data, B2 channel call data and D channel control information; continuously outputs the B1 channel call data in the form of 8-bit serial data to the signal line 712 at the speed of 64 kbps; continuously outputs the B2 channel call data in the form of 8-bit serial data to the signal line 714 at the speed of 64 kbps; and outputs the D channel control information in the form of 2-bit serial data to the output line 725.

The data transfer circuit 705 power-amplifies the burst signal sent from the transmission data adjusting circuit 708 and gives it to the transformer 704. Then, the burst signal is AMI-coded by signals from the signal lines 738, 739 and by the transformer 704, and released onto the digital line 4.

The diode bridge 703 neutralizes polarities of pulses of burst signals and the polarity of the power supply such that the operation can be ensured without checking the polarity upon installment of the digital line 4.

The choke coil 722 extracts a d.c. current without attenuating outgoing and incoming burst signals, and supplies it to the DC-DC converter 723. Accordingly, the DC-DC converter 723 makes +5V power source for activating the digital telephone.

The transformer 704 insulates the outgoing and incoming burst signals from the line for balancing them. Burst signals are transmitted to and from the digital extension circuit 11 of PBX 1 by the data transfer circuit 705, transmission data adjusting circuit 708 and data transfer portion 711.

The capacitor C1 is connected in series to the line-side terminal of the transformer 704 to cut off the d.c. current of the digital line 4.

Explained below are operations of the digital extension circuit 11 and the digital telephones 2A, 2B.

Figure 7:
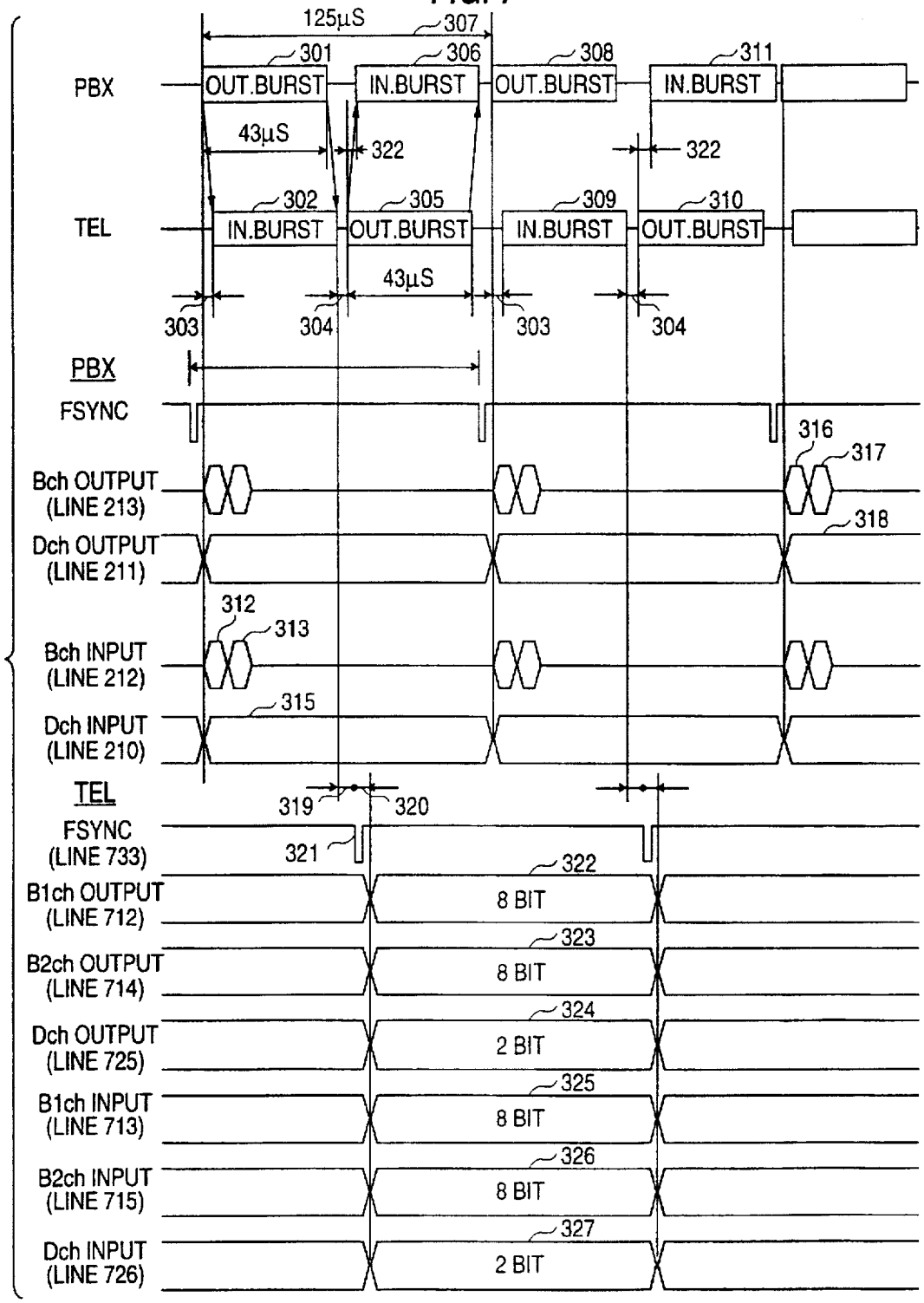
FIG. 7 is a timing chart of actions of the digital extension circuit and the digital telephones used in the present invention.

FIG. 7 is a timing chart for explaining actions of the digital extension circuit 11 and the digital telephones 2A, 2B. Because the digital telephones 2A and 2B operate at absolutely the same timing, FIG. 7 shows the timing of only one of the telephones.

In FIG. 7, call data from the outgoing highway 14 is introduced through the signal line 212. Sent to the signal line 212 are call data 312 for the B1 channel and call data 313 for the B2 channel. On the other hand, control information (D channel information) 315 from the controller 207 enters through the signal line 210. The data transfer portion 206 generates a burst signal shown in FIG. 3 on the basis of the B1 channel call data 312, B2 channel call data 313 and D channel information data 315, and releases it onto the digital line 4 as an outgoing burst signal 308.

On the other hand, when the data transfer portions 711 of the digital telephones 2A, 2B receive the burst signal 301 thus produced in the preceding cycle and coming from the digital line 4 as the incoming burst signal 302, the data transfer portions 711 separate the received burst signal 302, and output B1 channel call data to the signal line 712 for output of the B1 channel as outgoing call data 322 and B2 channel call data to the signal line 714 for output of the B2 channel as outgoing call data 323. The D channel component is output as outgoing control information 324 to the signal line 725.

The data transfer portion 711 of the digital telephone 2A (2B) generates the burst signal shown in FIG. 3 on the basis of the B1 channel call data 325 coming from the signal line 713, BA2 channel call data 326 coming from the signal line 715 and D channel control information 327 coming from the signal line 726, and releases the burst signal as an outgoing burst signal 310 onto the digital line 4.

On the other hand, when the burst signal 310 is introduced as a received burst signal 311 from the digital line 4, the data transfer portion 206 of the digital extension circuit 11 separates the burst signal 311, and outputs the B1 channel call data and the B2 channel call data to the signal line 213 as B1 channel call data 316 and B2 channel call data 317, respectively, for transmission to the incoming highway 13. The D channel component is output as outgoing control information 318 to the signal line 211 and transferred to the controller 207.

The burst signals 301, 308 from the digital extension line 11 reach the digital telephone 2A (2B) as incoming burst signals 302, 309 after a delay time 303 due to the length of the digital line 4. As to transmission of burst signals in the opposite direction, outgoing burst signals 305, 310 reach as incoming burst signals 306, 311 after a delay time 322.

The digital telephone 2A (2B) transmits the outgoing burst signals 305, 310 after a predetermined processing time 304 after the receipt of the burst signals 302, 309. A signal labelled with FSYNC in FIG. 7 is a synchronizing signal of the digital extension circuit 11 or the digital telephone 2A (2B).

Next explained is a way of multiple connection of the digital telephones 2A, 2B to the digital line 4.

Figure 8:
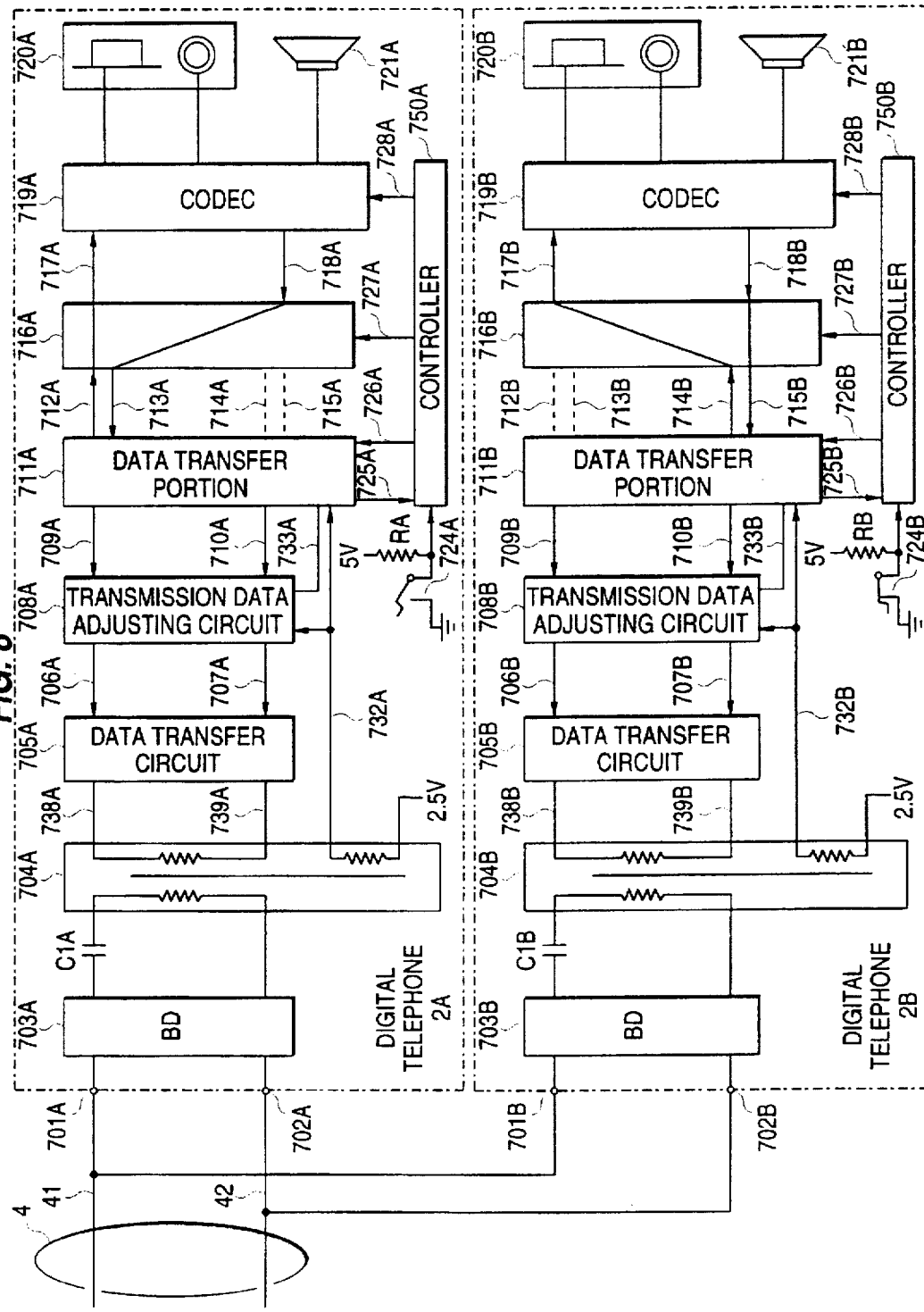
FIG. 8 is a block diagram explaining multiple connection of a plurality of digital telephones with the digital line.

FIG. 8 is a block diagram showing a direct multi-connected status of the digital telephones 2A and 2B. In FIG. 8, the digital telephones 2A, 2B have the same configuration as shown in FIG. 6; however, for easier identification, letter A is added to the reference numerals of respective components of the digital telephone 2A, and letter B is added to those of the digital telephone 2B. FIG. 8 omits illustration of other components of the digital telephones 2A, 2B which are not related to the multiple connection.

In FIG. 8, directly connected to one line 41 of the digital line 4 are the line terminal 701A of the digital telephone 2A and the line terminal 701B of the digital telephone 2B. Similarly, directly connected to the other line 42 of the digital line 4 are the line terminal 702A of the digital telephone 2A and the line terminal 702B of the digital telephone 2B.

In the digital telephone 2A, the switch 724A is in the opened position. Then, the controller 750A reads the "1" level and acknowledges that B1 channels have been assigned to telephone calls of the telephone 2A. Accordingly, the controller 750A controls the selector 716A to connect the signal line 712A for output of the B1 channel from the data transfer portion 711A with the signal line 717A for input of audio data to the CODEC 719A and to connect the signal line 713A for input of the B1 channel to the data transfer portion 711A with the signal line 718A for output of audio data from the CODEC 719A. In this case, the signal line for input of the B2 channel is held in the "1" level by the selector 716A.

Similarly with the digital telephone 2B, the switch 724B is in the closed position, and the controller 750B reads the "0" level and acknowledges that B2 channels have been assigned to telephone calls of the telephone 2B. Accordingly, the controller 750B controls the selector 716B to connect the signal line 714B for output of the B2 channel from the data transfer portion 711B with the signal line 717B for input of audio data to the CODEC 719B and to connect the signal line 715B for input of the B2 channel to the data transfer portion 711B with the signal line 718B for output of audio data from the CODEC 719B. In this case, the signal line for input of the B1 channel is held in the "1" level.

Figure 9:
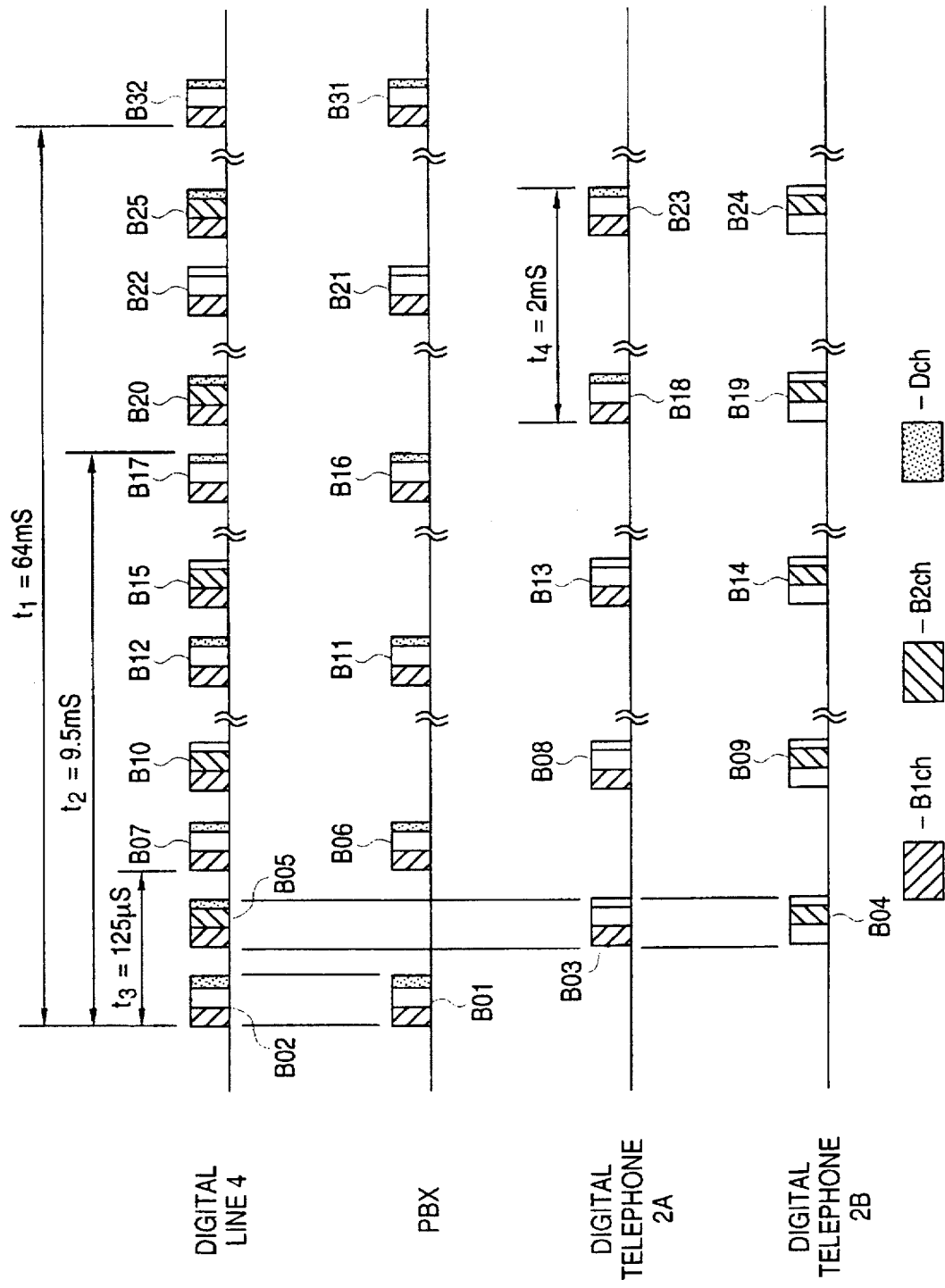
FIG. 9 is a diagram showing arrangements of burst signals transmitted on the digital line.

FIG. 9 is a diagram which shows a status of burst signals when the digital telephones 2A, 2B are in multiple connection with the digital line 4. That is, FIG. 9 shows an action of the digital telephone 2A for sending back control information through the D channel in response to control information sent through the D channel from the digital extension circuit 11 of PBX 1 for controlling the digital telephone 2A. In FIG. 9, when a burst signal B01 is transmitted from the digital extension circuit 11 of PBX 1, the burst signal appears as the burst signal B02 on the digital line 4. Note here that FIG. 9 shows the case where the burst signal B01 includes B1 channel call data and D channel control information for controlling the digital telephone 2A but does not include B2 channel call data. Then, the digital telephones 2A, 2B receive the burst signal B02 and execute the processing explained above with reference to FIG. 7.

More specifically with reference to FIG. 8, the data transfer portion 711A of the digital telephone 2A separates the burst signal B02 received from the signal line 732A, sends B1 channel call data to the signal line 712A for output of the B1 channel, and sends D channel control information to the controller 750A. The controller 750A receives and accepts the control information, recognizing it as control information for the digital telephone 2A itself. Although the B2 channel call data is also output to the signal line 714A, the controller 716A discards it. On the other hand, the data transfer portion 711B of the digital telephone 2B separates the burst signal B02 received from the signal line 732B, supplies B2 channel call data to the signal line 714B for output of the B2 channel, and supplies D channel control information to the controller 750B. Since this control information is for controlling the digital telephone 2A, the controller 750B discards it. Although B1 channel call data is also output to the signal line 712B, the selector 716B discards it.

The digital telephone 2A, having received the burst signal, generates a burst signal B03 on the basis of the call data from the signal line 713A for input of the B1 channel and information coming from the signal line 715A for input of the B2 channel and always representing the "1" level, and releases it onto the digital line 4. Also the digital telephone 2B generates a burst signal B04 on the basis of the call data from the signal line 715B for input of the B2 channel and information coming from the signal line 713B for input of the B1 channel and always representing the "1" level, and releases it onto the digital line 4. The burst signal B03 and the burst signal B04 are composed (added) into the burst signal B05 on the digital line 4. The burst signal B05 is then sent to the digital extension circuit 11 of PBX 1 and subjected to the processing explained above with reference to FIG. 7.

That is, the data transfer portion 206 of the digital extension circuit 11 separates the burst signal B05 received from the digital line 4, and releases B1 channel call data and B2 channel call data to the signal line 213 as B1 channel call data 316 and B2 channel call data 317, respectively, to transmit them to the incoming highway 13. The D channel component is output as control information 318 through the signal line 211 to the controller 207.

These behaviors are repeated with the period of 125 µs to communicate digital information between the digital line 4 and the digital telephones 2A, 2B.

Next explained is transmission of D channel control information. In FIG. 9, the digital extension circuit 11 of PBX 1 transmits control information for the digital telephone 2A by using D channels. More specifically, the digital extension circuit 11 of PBX 1 transmits control information for the digital telephone 2A by using D channels of the burst signals B01, B06, B11 and B16. The control information is made such that 152 bits form one message (as will be described later in greater detail), and one message of control information is sent to the digital telephone 2A by releasing 76 burst signals. Therefore, one message of control information is sent in 9.5 ms.

On the other hand, in receipt of one message of control information, the digital telephone 2A transmits control information for PBX 1 by using D channels. More specifically, the telephone 2A transmits control information for PBX 1 by using D channels of the burst signals B18 and B23. The control information is made such that 32 bits form one message (as will be described later in greater detail), and one message of control information is sent to PBX 1 by sending 16 burst signals. Therefore, one message of control information is sent in 2 ms.

When 64 ms have passed after transmission of control information by using D channels between the digital extension circuit 11 of PBX 1 and the digital telephone 2A and transmission of the burst signal B01 from the digital extension circuit 11 to the telephone 2A, the digital extension circuit 11 subsequently transmits control information for the digital telephone 2B by using D channels.

Figure 10:
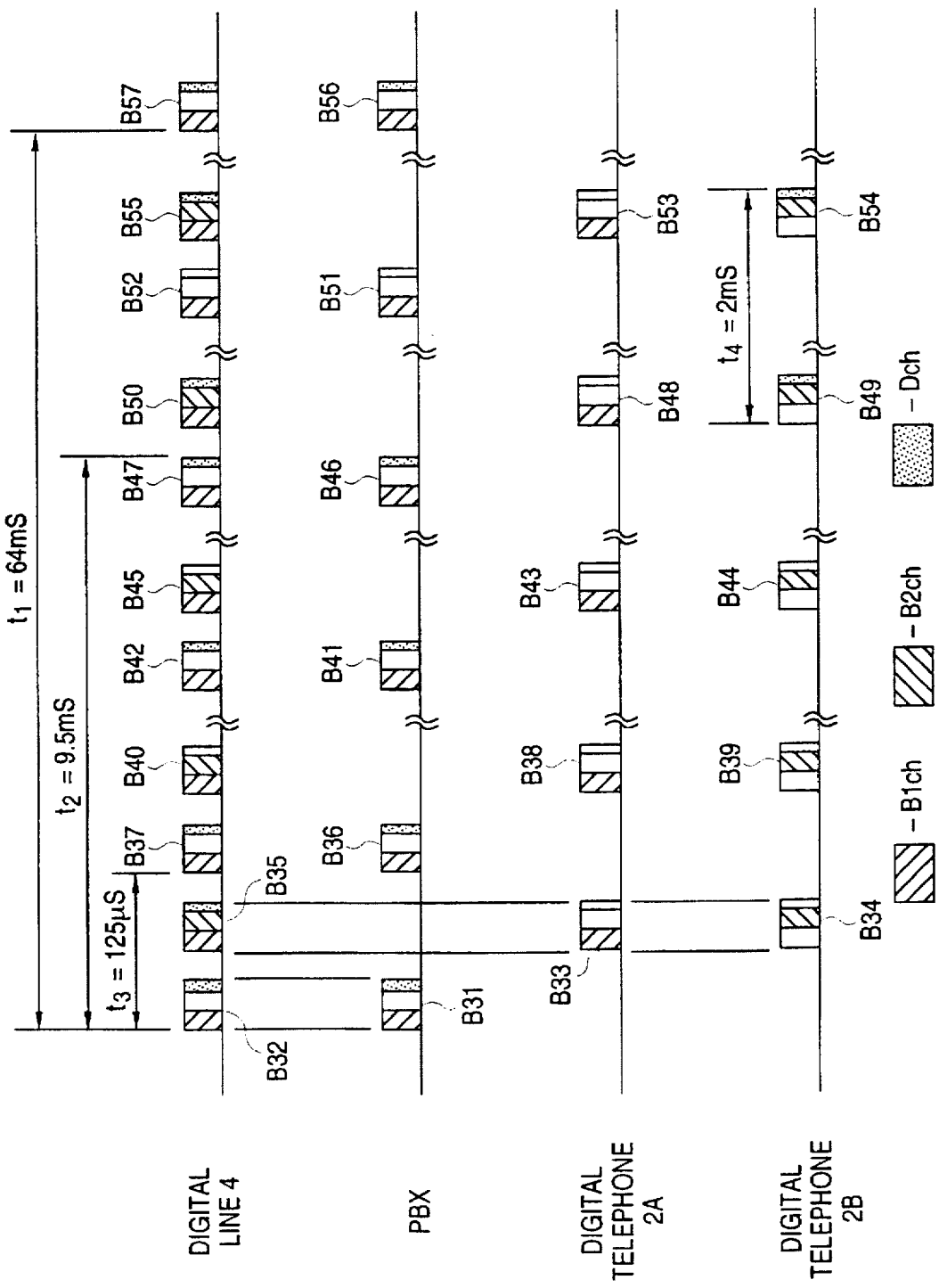
FIG. 10 is a diagram showing arrangements of burst signals transmitted on the digital line.

FIG. 10 is a diagram which shows a status of transmission of control information between the digital extension circuit 11 of PBX 1 and the digital telephone 2B. The digital extension circuit 11 of PBX 1 transmits control information for the telephone 2B by using D channels. That is, the digital extension circuit of PBX 1 transmits control information for the telephone 2B by using D channels of the burst signals B31, B36, B41 and B46. The control information has the same arrangement as that for the digital telephone 2A, and one message of control information is sent to the digital telephone 2B by releasing 77 burst signals.

On the other hand, in receipt of one message of control information, the digital telephone 2B transmits control information for PBX 1 by using D channels. That is, the telephone 2B transmits control information for PBX 1 by using D channels of the burst signals B19 and B24. The control information has the same arrangement as that for the digital telephone 2A, and one message of control information for PBX 1 is sent by releasing 16 burst signals. Therefore, one message of control information is transmitted in 2 ms.

Figure 11:
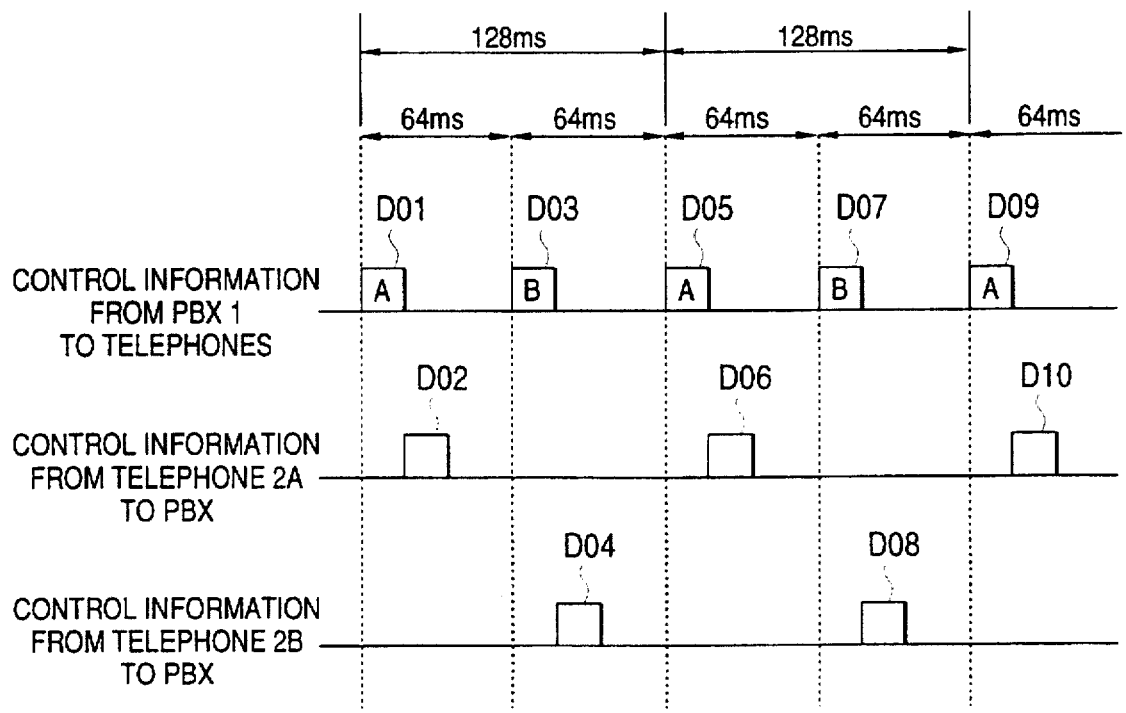
FIG. 11 is a diagram showing control information transmitted by using D channels.

When 64 ms have passed after transmission of control information by using the D channel between the digital extension circuit 11 of PBX 1 and the digital telephone 2B and transmission of the burst signal B31 from the digital extension circuit 11 to the telephone 2B, the digital extension circuit 11 again transmits control information for the digital telephone 2A by using D channels. These behaviors are repeated and continued with the period of 128 ms as shown in FIG. 11.

Next explained is how a burst signal sent from the digital telephone 2A and a burst signal sent from the digital telephone 2B into a single burst signal on the digital line 4.

Figure 12:
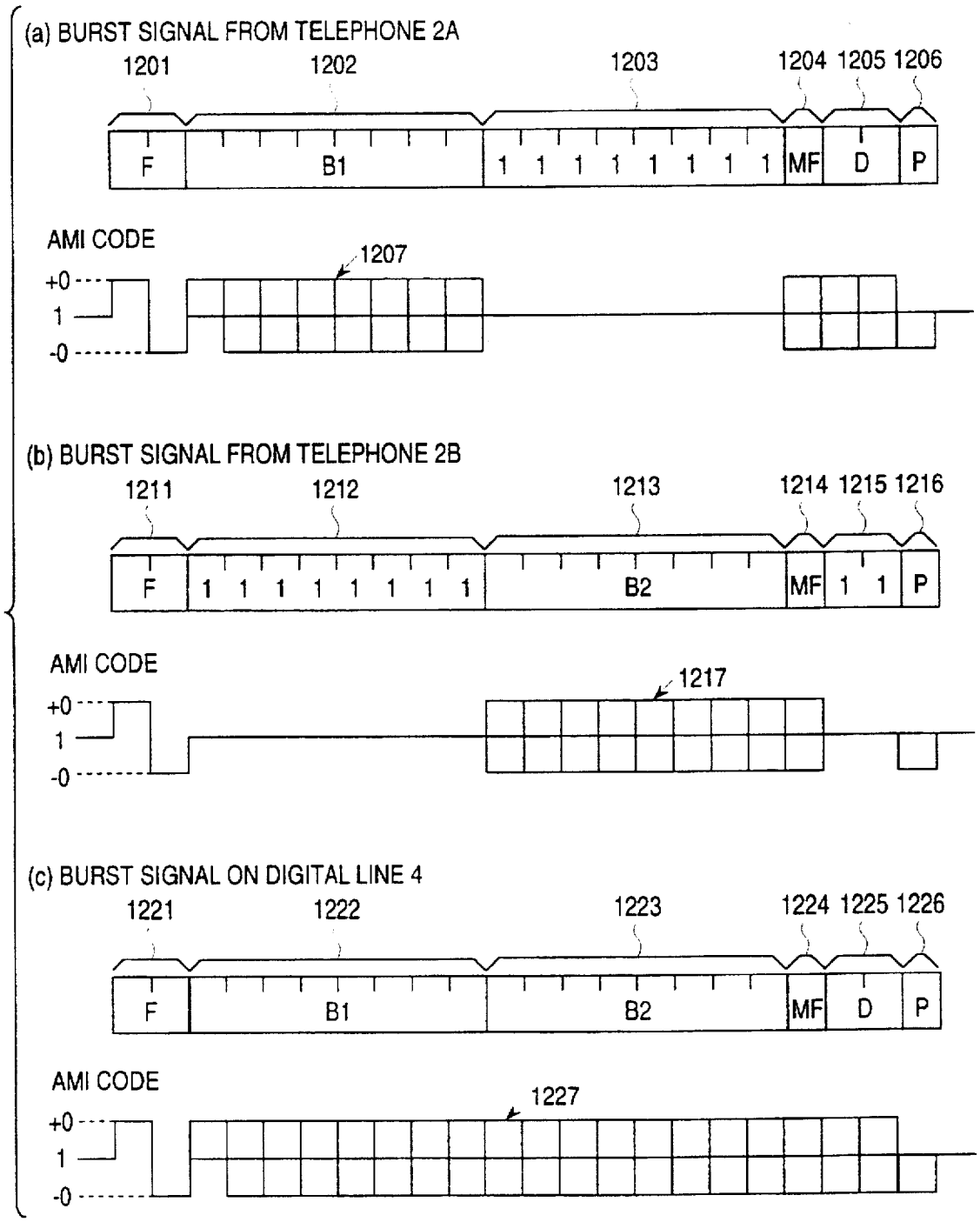
FIG. 12 is a diagram explaining composition of burst signals sent from two digital telephones onto the digital line.

FIGS. 12 and 13 are diagrams which show how a burst signal from the digital telephone 2A and a burst signal from the digital telephone 2B are composed into a single burst signal, in Which FIG. 12 shows a status where the telephone 2A uses D channels, and FIG. 13 shows a status where the telephone 2B uses D channels.

In FIG. 12, (a) denotes a burst signal sent from the digital telephone 2A, which includes a start bit 1201, B1 channel portion 1202 containing call data, B2 channel portion 1203 containing all "1" data, D channel portion 1205 containing control information, and parity bit 1206. The burst signal (a) is released onto the digital line 4 in an AMI-coded form as illustrated at 1207.

(b) denotes a burst signal sent from the digital telephone 2B, which includes a start bit 1211, B1 channel portion 1212 containing all "1" data, B2 channel portion 1213 containing call data, MF bit 1214, D channel portion 1215 containing all "1" data, and parity bit 1216. The burst signal (b) is released onto the digital line 4 in an AMI-coded form as illustrated at 1217.

On the digital line 4, the AMI-coded burst signal 1207 and the AMI-coded burst signal 1217 are added (physically, respective voltages are added) to form an AMI-coded burst signal 1227 as shown at (c). Therefore, the burst signal on the digital line 4 represents the arrangement shown in FIG. 3, which includes the start bit 1221, B1 channel portion 1222 containing call data of the telephone 2A, B2 channel portion 1223 containing call data of the telephone 2B, MF bit 1224, D channel portion 1225 containing control information for the telephone 2A, and parity bit 1226.

As to transmission of control information by the digital telephone 2B, the foregoing explanation also applies as shown in FIG. 13, and detailed reference thereto is omitted. When neither the telephone 2A or 2B transmits control information, D channel portions of their burst signals apparently represent the all "1" status, and explanation thereof is also omitted.

Figure 14:
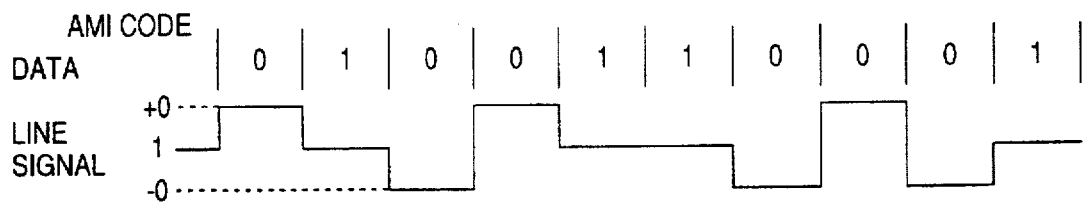
FIG. 14 is a diagram explaining the AMI coding.

Explained below is an AMI-code. FIG. 14 is a diagram depicting an AMI code. The AMI coding employs law regards the binary "0" as a positive or negative pulse, and the binary "1" as no pulse. In addition, binary "0" pulses must be alternately changed in polarity. Therefore, as shown in FIG. 14, if a data represents "0100110001", then the line signal appears as positive pulse, no pulse, negative pulse, positive pulse, no pulse, no pulse, negative pulse, positive pulse, negative pulse, and no pulse.

Next explained is a specific example in which burst signals are released from the respective digital telephones 2A, 2B and are combined into a single burst signal on the digital line 4.

Figure 15:
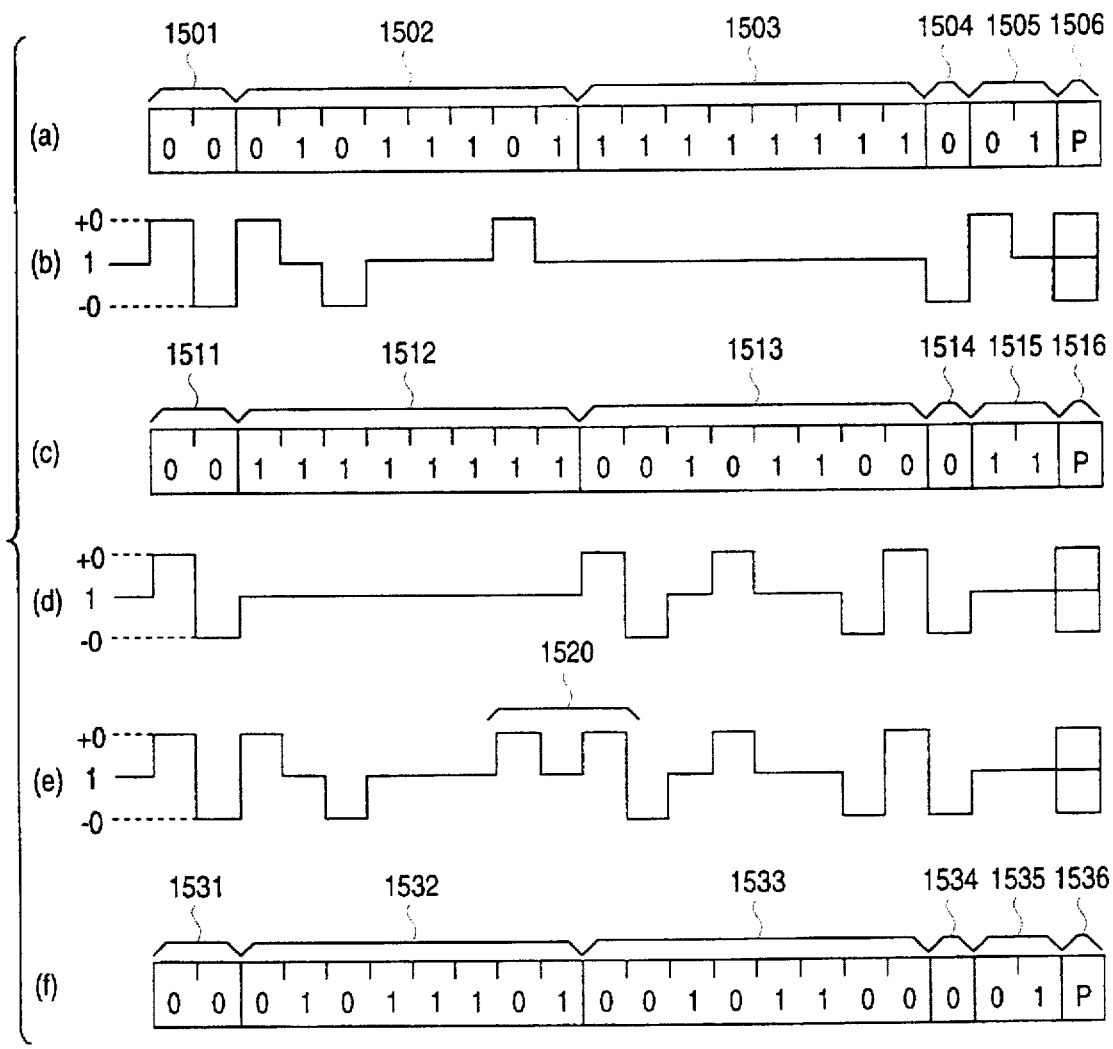
FIG. 15 is a diagram explaining an undesired form of composition of burst signals sent from two digital telephones onto the digital line.
Figure 16:
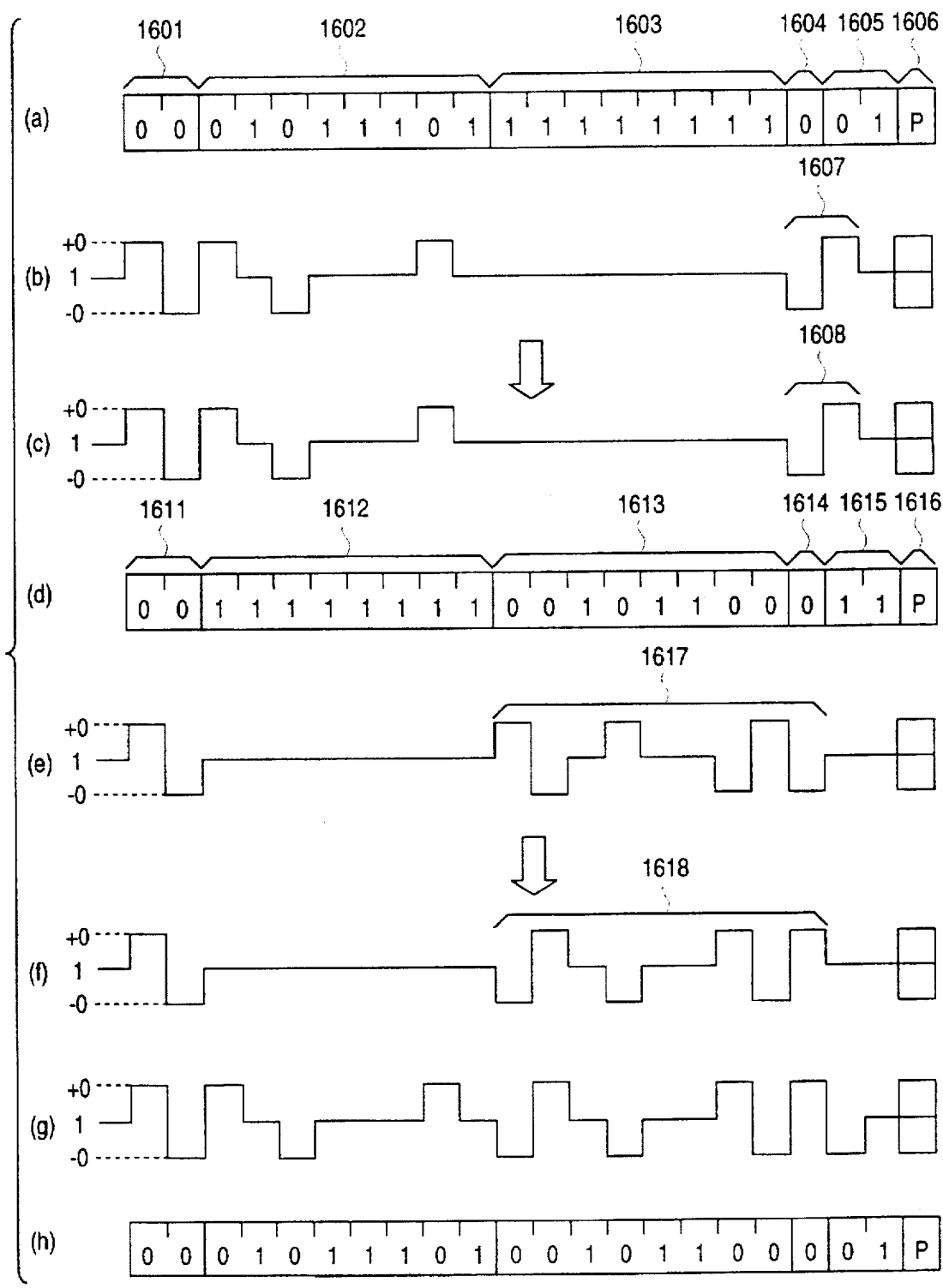
FIG. 16 is a diagram explaining a proper form of composition of burst signals sent from two digital telephones onto the digital line.

FIGS. 15 and 16 are diagrams depicting the aspect, in which FIG. 15 shows that mere composition of burst signals causes an undesirable result. In FIG. 15, (a) denotes a burst signal sent from the telephone 2A and containing data of "00010111011111111001P" (where P is a parity bit), and (b) denotes the AMI-coded form of the burst signal (a). (c) denotes a burst signal sent from the telephone 2B and containing data of "00111111100101100011P", and (d) denotes the AMI-coded form of the burst signal (b). If the AMI-coded burst signal shown at (b) and the AMI-coded burst signal shown at (d) are simply composed on the digital line 4, it may cause pulses of the same polarity to successively appear as indicated at 1617 in (e), and fails to accurately AMI-code the burst signal shown in (f) to be transmitted to PBX 1.

FIG. 16 is a diagram showing the accurately AMI-coded status of the burst signal to be transmitted to PBX 1. In FIG.

16, (a) denotes a burst signal sent from the telephone 2A, which contains data of "0001011101111111111001P", and (b) denotes a simply AMI-coded form of the burst signal (a). (c) shows an adjusted form of the burst signal (a), in which the portion 1608 has been inverted in polarity from the corresponding portion 1607 of (b). (d) denotes a burst signal sent from the telephone 2B, which contains data of "001111111100101100011P", and (e) denotes a simply AMI-coded form of the burst signal (d). (f) shows an adjusted form of the burst signal (d), in which the portion 1618 has been inverted in polarity from the corresponding portion 1617 of (e).

By composing the burst signals (c) and (f) adjusted in the respective digital telephones 2A, 2B, the burst signal shown at (g) is obtained, and it can accurately be AMI-coded as shown at (h) for transmission to PBX 1.

Next explained is an arrangement of the transmission data adjusting circuit to ensure accurate AMI-coding upon composition of a burst signal as referred to above.

Figure 17:
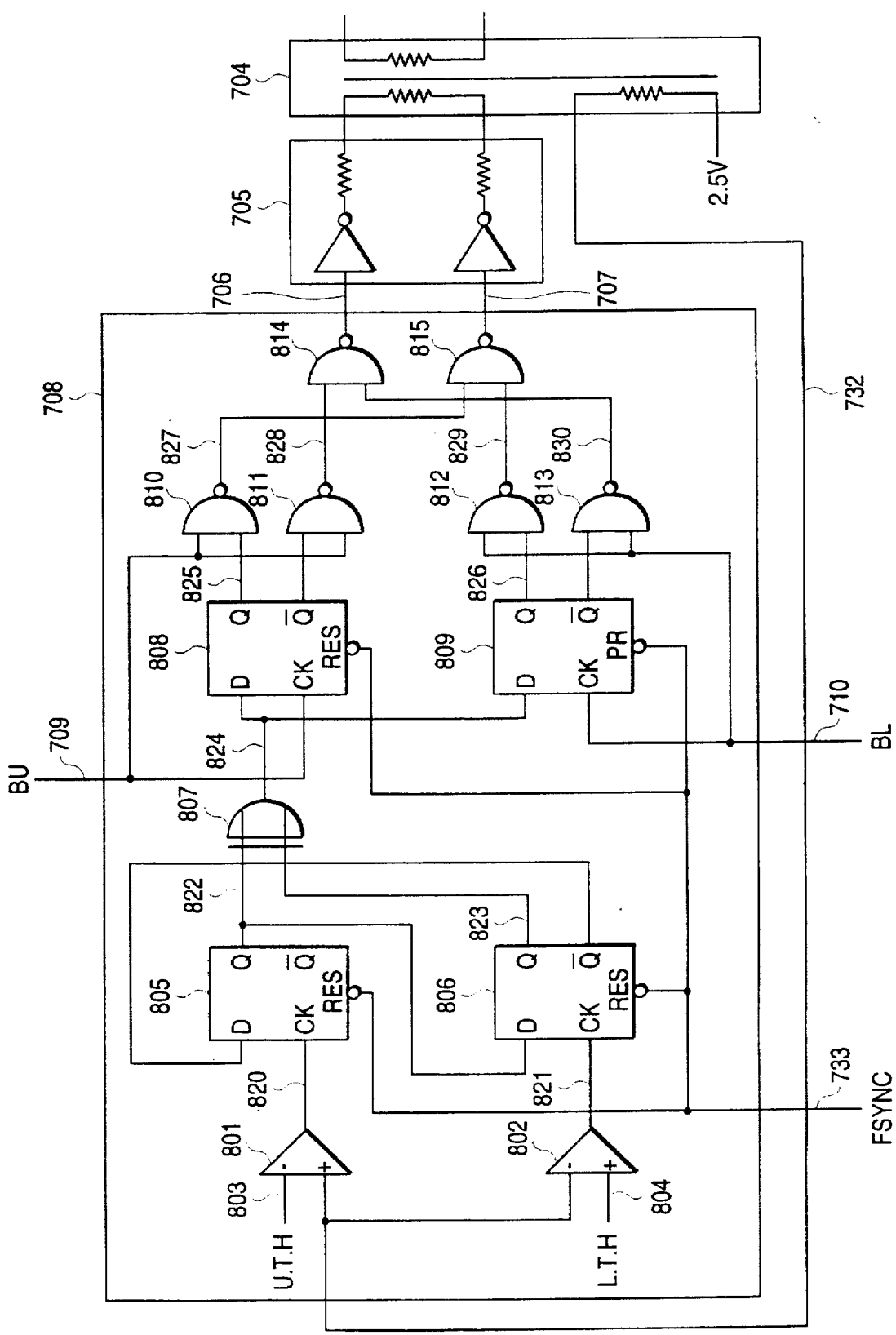
FIG. 17 is a circuit diagram of an outgoing data adjusting circuit in each digital telephone.
Figure 18:
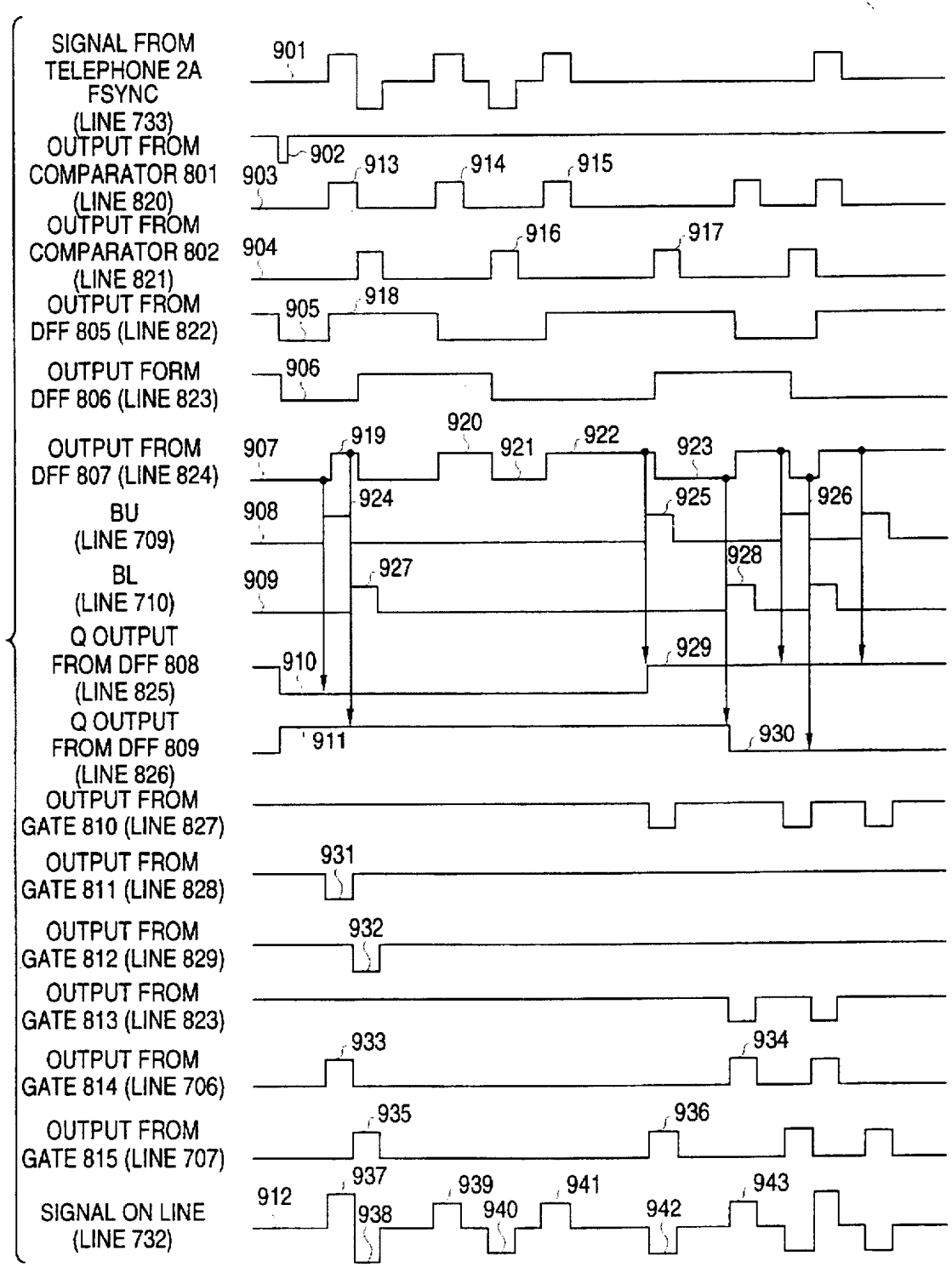
FIG. 18 is a timing chart explaining the behavior of the outgoing data adjusting circuit of the digital telephone.

FIG. 17 is a circuit diagram of the transmission data adjusting circuit 708 shown in FIG. 6 (the transmission data adjusting circuits 708A, 708B of FIG. 8 also have the same circuit arrangement), and FIG. 18 is a timing chart for explaining actions of the transmission data adjusting circuit 708.

First of all, reference is made to the situation of the transmission data adjusting circuit 708 in the system. As shown in FIG. 8, the telephones 2A, 2B are in multiple connection with the digital line 4, and explanation is made with main reference to the transmission data adjusting circuit 708B in the digital telephone 2B. Also note that the digital telephone 2A is set to select B1 channel call data through the switch 724A whereas the digital telephone 2B is set to select call data of the B2 channel through the switch 724B.

Under the conditions set above, respective signals to and from the transmission data adjusting circuit 708 and behaviors thereof are explained in sequence.

Signals on output lines 709, 710 from the data transfer portion. 711 are not yet composed and not yet adjusted into a burst signal to be transmitted, and correspond to a positive polarity output line and a negative polarity output line for AMI, respectively. Signals on output lines 706, 707 have been adjusted in transmission polarity as transmission data, and correspond to positive and negative polarities for AMI, respectively. The output lines 706, 707 are connected to the transformer 704 via the data transmission circuit 705 to create an AMI code. The AMI code is sent to line terminals 701, 702 through the diode bridge 703 and sent therefrom to the telephone 2B and the digital extension circuit 11.

Behaviors for AMI coding will be explained below in detail. In FIG. 8, a burst signal from the digital extension circuit 11 is applied to the line terminals 701B, 702B, then enters in the transformer 704B via the diode bridge 703B, and is transferred to the data transfer portion 711B through the signal line 732B. When Completing the receipt, the data transfer portion 711B applies a synchronous signal in the "0" level as shown at 902 (FIG. 18) to the transmission data adjusting circuit 708B. By using this signal, an output 822 from DFF (D flip-flop) 805, output 823 from DFF 806, output 825 from DFF 808 and output 826 from DFF 809 are initialized to the "0" level, "0" level, "0" level and "1" level, respectively, as shown at 905, 906, 910 and 911 in FIG. 18. If the telephones 2A, 2B are substantially equally distant from the digital extension circuit 11, then the telephone 2A also completes the reception and supplies a synchronous signal at substantially the same time, and executes subsequent sequences in the same manner as the telephone 2B.

A signal line 803 incoming to a comparator 801 is supplied with a threshold voltage of a value between the intermediate voltage 2.5V of the signal line 732 and the plus-side peak voltage of the positive polarity pulse of the AMI code appearing on the signal line 732. A signal line 804 incoming to a comparator 802 is supplied with a threshold voltage of a value between the intermediate voltage 2.5V of the signal line 732 and the minus-side peak voltage of the negative polarity pulse of the AMI code appearing on the signal line 732.

When no pulse exists on the signal line 732 (when no pulse exists on the digital line 4), that is, when the signal line 732 exhibits 2.5V as shown at 912, the output signal line 820 from the comparator 801 is in the "0" level as shown at 903, and the output signal line 821 from the comparator 802 is in the "0" level as shown at 904. Since DFF 805, 806 are in the initialized status as explained above, the output signal line 824 from the exclusive OR (ExOR) gate 807 are in the "0" level as shown at 907. This is the data input to the DFF 808, 809.

When the first bit of the start bits, namely, pulse 924, is released onto the signal line 709 from the data transfer portion 711B, the rising behaves as a clock input to DFF 808, which latches the data input from the signal line 824 in the "0" level to hold the output signal line 825 of DFF 808 in the "0" level as shown at 910. At the same time, the pulse 924 is input to the NAND gate 811 which in turn applies the "0" level pulse 931 to the NAND gate 814 through the output signal line 828. On the other hand, since no "1" level pulse is applied to the signal line 710 as shown at 909, the other input to the NAND gate 814, namely the output signal line 830 from the NAND gate 813, maintains the "1" level, and the output 706 from the NAND gate 814 supplies the "1" level pulse as shown at 933. At this time, all of the output signal lines 827, 829 and 830 of the NAND gates 810, 812 and 813 represent the "1" level, and the output 707 of the NAND gate 815 represents the "0" level. Therefore, the signal line 706 becomes "1" level, and the signal line becomes the "0" level such that a voltage is applied to the transformer 704 via the data transmission circuit 705, and a positive polarity pulse is supplied on the digital line 4 as shown at 937.

The same behaviors occur also in the telephone 2A, and the pulse 937 appearing on the digital line 4 is the sum of the pulses supplied from the telephones 2A, 2B.

The pulse 937 is also released to the signal line 732 through the transformer 704, and appears as the pulse 913 on the output signal line 820 of the comparator 801. The pulse 937 enters in the clock of DFF 805, and the rising thereof causes the output signal line 822 from DFF 805 to represent the "1" level as shown at 918. Accordingly, DFF 805 stores the supply of the positive polarity pulse to the digital line 4. At this time, the output signal line 824 of the ExOR gate 807 represents the "1" level as shown at 919, and preparation is made such that a next pulse to be sent to the digital line 4 becomes negative.

When the pulse 927 is supplied as the second bit of the start bits through the signal line 710 from the data transfer portion 711B, the rising thereof latches DFF 809 such that the output signal line 826 becomes the "1" level, and the pulse 932 is output through the signal line 829 from the NAND gate 812. Responsively, the pulse 935 is output through the pulse 932 from the NAND gate 815 such that the signal line 706 outputs the "0" level and the signal line 707 outputs the "1" level. As a result, a voltage is applied to the transformer 704 via the data transmission circuit 705, and a negative polarity pulse as shown at 938 is released on the digital line 4. The telephone 2A also behaves in the same manner, and the pulse 938 results in the sum of the pulses sent from the telephones 2A, 2B.

Next explained are behaviors for transmitting call data of the B1 channel. As noted above, the system is set up such that the telephone 2A alone sends call data of the B1 channel. Therefore, if the pulses 939, 940 and 941 with polarities shown in FIG. 18 are supplied from the telephone 2A onto the digital line 4, pulses 914, 916 and 915 are released to the output signal lines 820, 821 from the comparators 801, 802. Those pulses 939, 940, 941 show that call data of the B1 channel from the telephone 2A is "11010101" in which third, fifth and seventh bits are the "0" level.

Signals on the output signal line 824 from the ExOR gate 807 are obtained as the "1" level shown at 920, "0" level as shown at 921 and "1" level as shown at 922 in correspondence with the pulses 939, 940, 941. As described above, this output 824 results from storing in DFF 805, 806 the polarity of the pulse sent onto the digital line 4, and the final output results in the "1" level shown at 922. Therefore, DFF 805, 806 store and recognize that the polarity of a next pulse to be sent to the digital line 4 should be negative.

The telephone 2B is set up to call data of the B2 channel. Then the digital line 4 is supplied with only pulses of call data output from the telephone 2B. If the call data from the B2 channel is "11011010", then the third, sixth and eighth bits of call data of the B2 channel represent the "0" level. As a result, pulses 925, 926 are output as being correspondent to the signal line 709 at the third and eighth bits of the call data, and the pulse 928 is output as being correspondent to the signal line 710 at the sixth bit. Since the pulse 927 has been sent by using the signal line 710, the pulse 925 is sent through the signal line 709.

The "1" level output shown at 922 coming through the output signal line 824 from the ExOR gate 807 is latched in DFF 808 by the rising of the pulse 925 from the signal line 709, and the output 825 from DFF 808 is inverted to the "1" level as shown at 929, which shows that the output must be inverted in polarity. After that, because of behaviors of NAND gate 810, 811, 812, 183, 814 and 815, NAND gate 815 supplies the pulse 936 on the signal line 707. As a result, the "0" level is output to the signal line 706, and the "1" level to the signal line 707. Accordingly, a voltage is applied to the transformer 704 via the data transmission circuit 705, and a negative polarity pulse shown at 942 is released onto the digital line 4.

In response to the pulse 942 on the digital line 4, the pulse 917 appears on the output signal line 821 from the comparator 802, and the "0" level shown at 923 is output through the output signal line 824 from the ExOR gate 807. This shows that a next pulse to be transmitted to the digital line 4 should have the positive polarity. Consequently, the "0" level shown at 923 output through the output signal line 824 from the ExOR gate 807 is similarly latched in DFF 809 by the rising of the pulse 928 from the signal line 710, and the output signal line 826 from DFF 809 is inverted to the "0" level as shown at 930. Therefore, the pulse 928 from the signal line 710 is released as the output pulse 934 of the NAND gate 814. As a result, the "1" level is released to the signal line 706, and the "0" level to the signal line 707. Accordingly, a voltage is applied to the transformer 704 via the data transmission circuit 705, and a positive polarity pulse as shown at 943 is released onto the digital line 4.

Thus, the polarities of pulses sent from the telephones 2A, 2B to the digital line 4 are stored in DFF 805 and DFF 806 provided in the transmission data adjusting circuit 708 of the telephones 2A, 2B, respectively, such that polarities of pulses to be next released are determined by DFF 808, 809, ExOR gate 807, NANd gate 810, 811, 812, 813, 814 and 815. Therefore, it is prevented that pulses sent from the telephones 2A, 2B cancel each other, and that pulses having the same polarity, either of B1 channel call data, B2 channel call data, D channel control information, start bits or MF bits, are successively released on the digital line 4 cause a defective AMI coding upon composing AMI-coded burst signals. That is, the system never fails to compose proper AMI codes on the digital line 4.

Since burst signals sent from the telephones 2A, 2B are composed on the digital line 4 and sent to the digital extension circuit 11 of PBX 1, the telephone 2A is connected with digital extension circuit 11 by B1 channels, and the telephone 2B by B2 channels.

Note that burst signals on the digital line 4 for transmission between the digital extension circuit 11 of PBX 1 and the telephones 2A, 2B are based on a Ping-Pong transmission system in which, as shown in FIG. 7, the down burst signal 301 from PBX 1 toward the telephones 2A, 2B and the up burst signal 306 from the telephones 2A, 2B toward PBX 1 are transmitted alternately.

In this system, when the telephones 2A, 2B are in multiple connection with the digital line 4 as shown in FIG. 8, the data transfer portion 711B of the telephone 2B, for example, may receive the down burst signal 301 sent from the PBX 1 instead of the up burst signal 306 sent from the telephone 2A, which causes the down burst signal 301 to be added to the up burst signal sent from the telephone 2B, thereby disabling normal communication. That is, since the digital telephone 2B receives the up burst signal 306 from the telephone 2A as being a down burst signal, D channel control information becomes inappropriate.

In order to ensure always normal communication, when D channel control information is inadequate, the controllers 750A, 750B of the telephones 2A, 2B reset the data transfer portions 711A, 711B to have them receive next data, and repeat the reset until they receive regular D channel control information. This operation will be described later in greater detail.

Next explained is the operation of the entire system having the arrangement shown in FIGS. 1 and 8.

Figure 19:
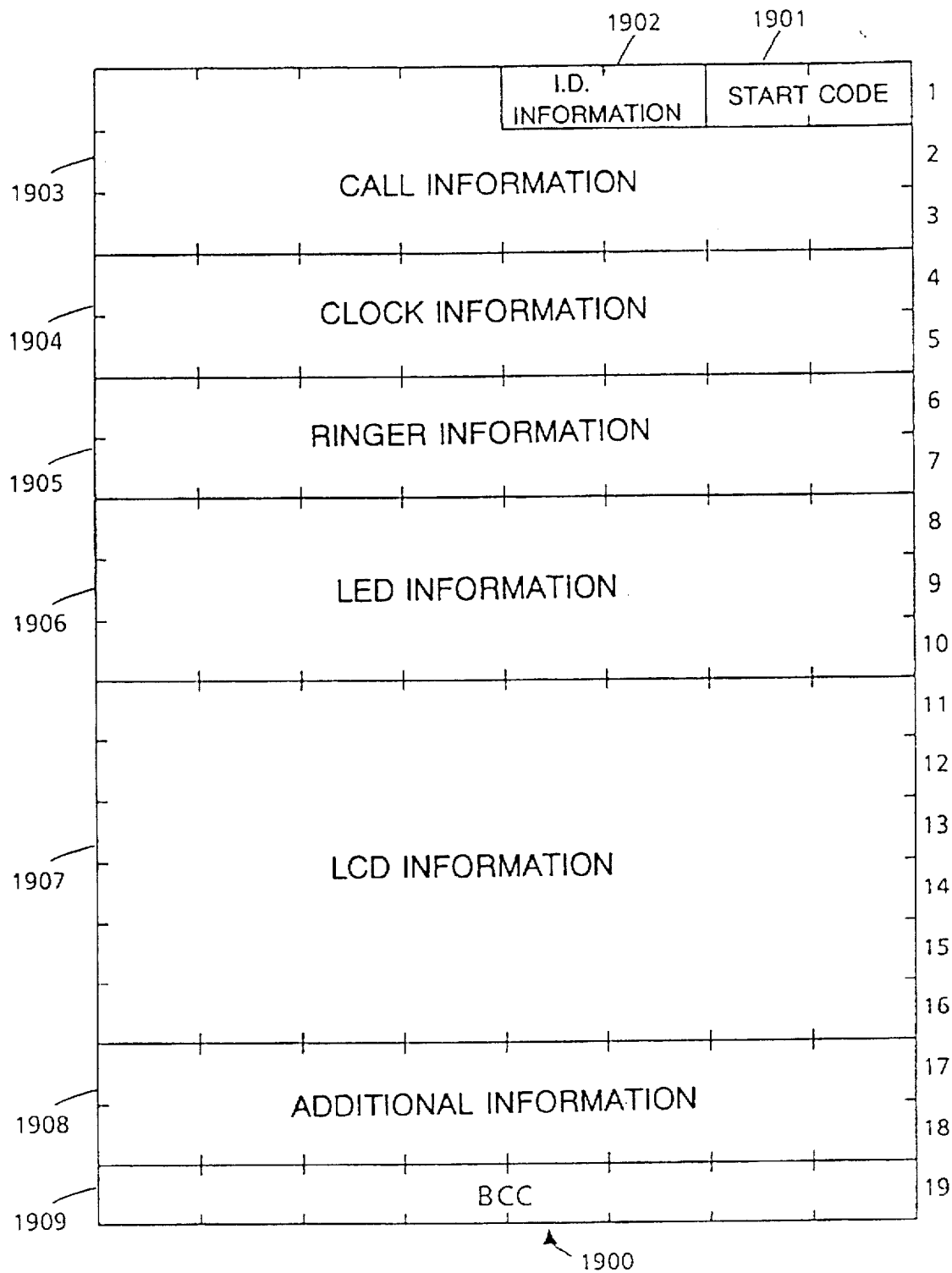
FIG. 19 is a diagram showing the content of control information sent from the digital extension circuit to one of the digital telephones.

FIG. 19 is a diagram showing the content of control information sent through the D channel from PBX 1 to the telephones 2A, 2B. In FIG. 19, control information 1900 includes a start code 1901, identifying (I.D.) information 1902 for discriminating control information addressed to the telephone 2A from that addressed to the telephone 2B, call information 1903 for controlling the CODEC, etc., clock information 1904 for clock indication on a display, ringer information 1905 for instructing a sort of call sound, interphones, etc., LED information 1906 for instructing continuous lighting, intermittent lighting, lighting-off of LED, LCD information 1907 for instructing display of letter information on a display, additional information 1908, and BCC information 1909 for BCC check. Control information 1900 consists of 152 bits (=8 bytes×19) in total.

Figure 20:
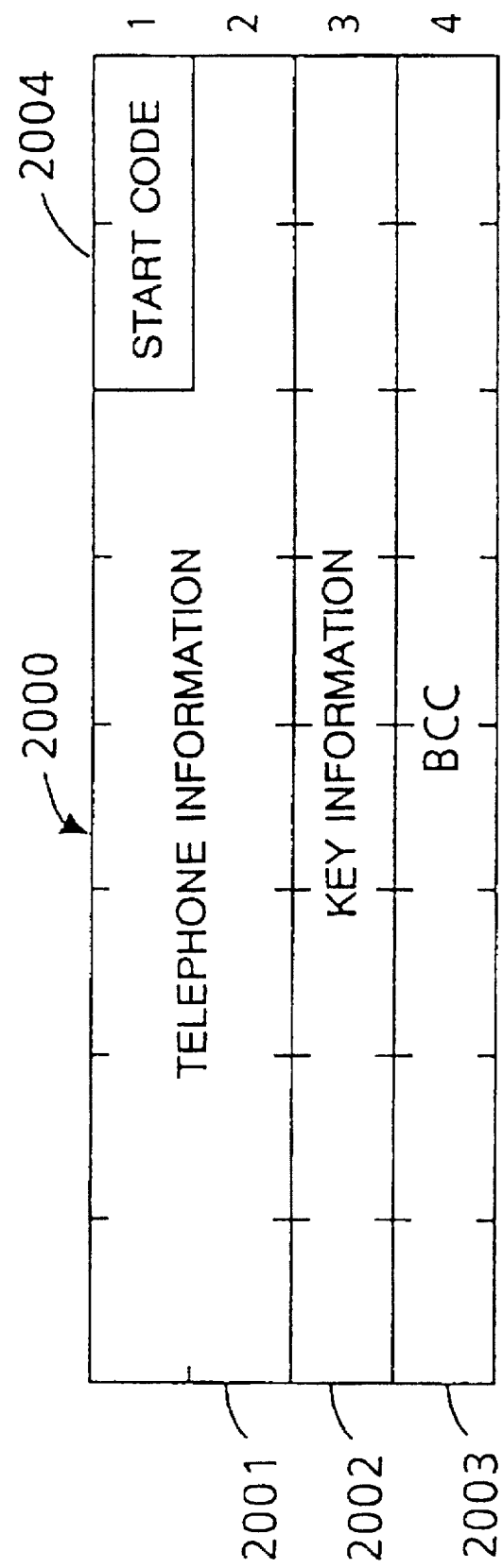
FIG. 20 is a diagram showing the content of control information sent from one of the digital telephones to the digital extension circuit.

FIG. 20 is a diagram showing the content of control information sent through the D channel from the telephones 2A, 2B to PBX 1. In FIG. 20, control information 2000 includes a start code 2004, telephone information 2001 indicating the status of digital telephones, key information 2002 indicating the status-of the key matrix, and BCC information 2003 for BCC check. The control information 2000 consists of 32 bits (=8 bytes×4) in total.

FIGS. 21 to 27 are flow charts showing behaviors of the digital extension circuit 11 and of the digital telephones 2A, 2B to show the procedure for transmission of control information between the digital extension circuit 11 and the telephones 2A, 2B.

At first, power is supplied to the digital extension circuit 11 (S01). Then, the telephones 2A, 2B are connected to the digital line 4 and supplied with source power (S02, S03). The telephone 2A then reads the status of the switch 724A as explained above with reference to FIG. 8, acknowledges that the B1 channel has been assigned thereto for telephone calls, and so controls the selector 716A (S04). Similarly, the telephone 2B reads the status of the switch 724B, acknowledges that the B2 channel has been assigned thereto for telephone calls, and so controls the selector 716B (S05).

After that, the digital extension circuit 11 releases onto the digital line 4 control information 190 for the telephone 2A (S06), and transmits and receives control information to and from the central control unit 16 (S13).

On the other hand, the telephone 2A receives control information 1900 (S07), and takes it in (S09), recognizing from the I.D. information 1902 contained in the control information 1900 that the control information has been sent to the telephone 2A itself. The telephone 2A then transmits control information 2000 to the digital extension circuit 11 (S11), masks the path from the digital extension circuit 11 to prohibit reception of the next control information 2000 from the digital extension circuit 11 (because the next control information 1900 from the digital extension circuit 11 is for controlling the telephone 2B) (S15), and controls the telephone by using the received control information 1900 (S17).

The telephone 2B also receives control information 1900 sent from the digital extension circuit 11 to the telephone 2A (S08), but invalidates it (S12), recognizing from the I.D. information 1902 contained in the control information 1900 that the control information has been sent to the other telephone 2A (S10). Then, the telephone 2B controls the telephone (S18).

In receipt of the control information 2000 from the telephone 2A (S14), the digital extension circuit 11 sends to the central control unit 16 control information containing the content of the received control information 2000, and receives control information sent from the central control unit 16 (S16). Then, the extension circuit 11 releases on the digital line 4 control information 1900 for the telephone 2B (S19), and transmits and receives control information to and from the central control unit 16 (S23).

The telephone 2B, in receipt of the control information 1900 (S20), takes it in (S21), recognizing from the I.D. information 1902 contained in the control information 1900 that the control information 1900 has been sent to the telephone 2B itself. The telephone 2B then transmits control information 2000 to the digital extension circuit 11 (S22), and masks the path from the digital extension circuit 11 to prohibit reception of next control information 2000 from the digital extension circuit 11 (because the next control information 1900 from the digital extension circuit 11 is for controlling the other telephone 2A) (S25), and controls the telephone by using the received control information 1900 (S29).

Since the masking of the telephone 2A made in S15 to prohibit receipt of signals .still continues, the telephone 2A does not receive the current control information 2000 from the digital extension circuit 11. The telephone 2A releases the prohibition about 100 ms after the masking in S15 (S27), and controls the telephone (S28).

When the digital extension circuit 11 receives the control information 2000 from the telephone 2B (S24), it sends to the central control unit 16 control information containing the content of the received control information 2000, and receives control information sent from the central control unit 16 (S26). The digital extension circuit then releases onto the digital line 4 control information 1900 for the telephone 2A (S30), and transmits and receives control information to and from the central control unit 16.

The telephone 2A, in receipt of the control information 1900 (S31), takes it in (S32), recognizing from the I.D. information 1902 contained in the received control information that the control information 1900 has been sent to the telephone 2A itself. Thereafter, the telephone 2A transmits control information 2000 to the digital extension circuit 11 (S33), then masks the path from the digital extension circuit 11 to prohibit receipt of next control information 1900 from the digital extension circuit (S36), and controls the telephone by using the received control information 1900 (S38).

Since the masking of the telephone 2B made in S25 to prohibit receipt of signals still continues, the telephone 2B does not receive the current control information 2000 from the digital extension circuit 11. The telephone 2B releases the prohibition about 100 ms after the masking in S25 (S39), and controls the telephone (S40).

After that, the digital extension circuit 11, in receipt of the control information 2000 from the telephone 2A (S35), sends to the central control unit 16 control information containing the content of the control information 2000, and receives control information sent from the central control unit 16 (S37). The digital extension circuit 11 then releases onto the digital line 4 control information 1900 for the telephone 2B (S41), and thereafter repeats the same processing.

Figure 21:
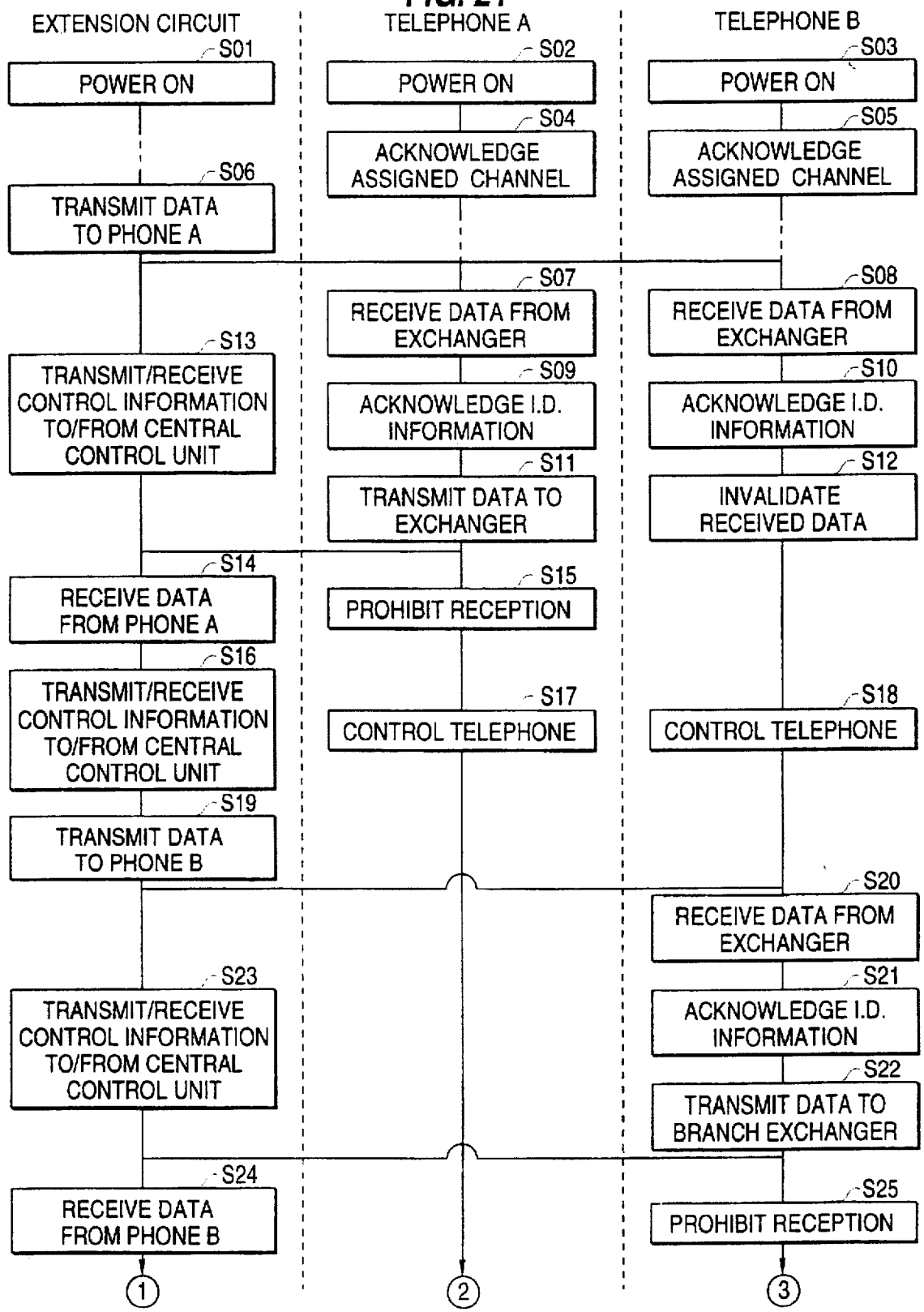
FIG. 21 is a flow chart (part 1) showing actions of the digital extension circuit and digital telephones A and B connected to the digital extension circuit.
Figure 22:
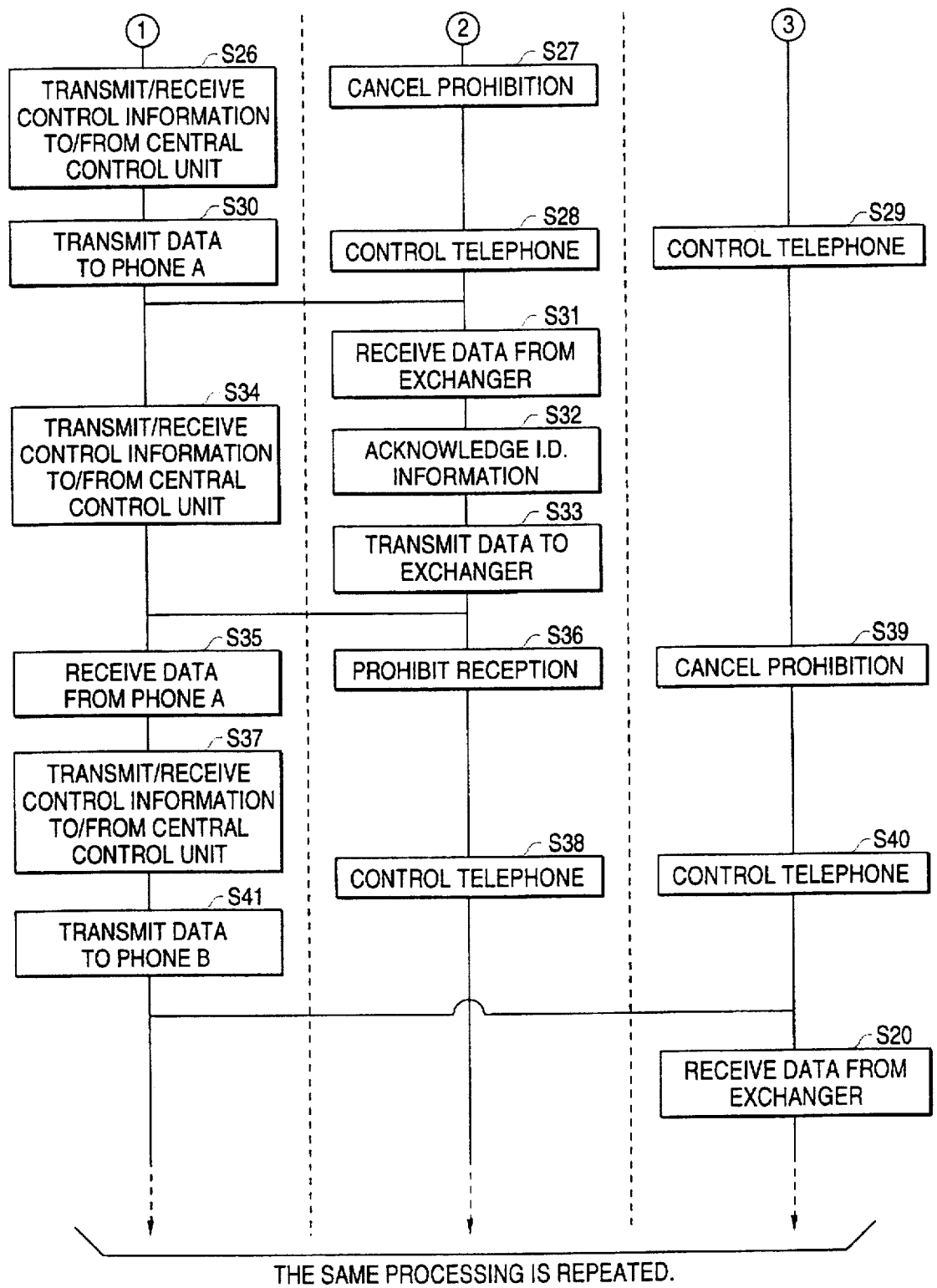
FIG. 22 is a flow chart (part 2) showing actions of the digital extension circuit and the digital telephones connected to the digital extension circuit.
Figure 23:
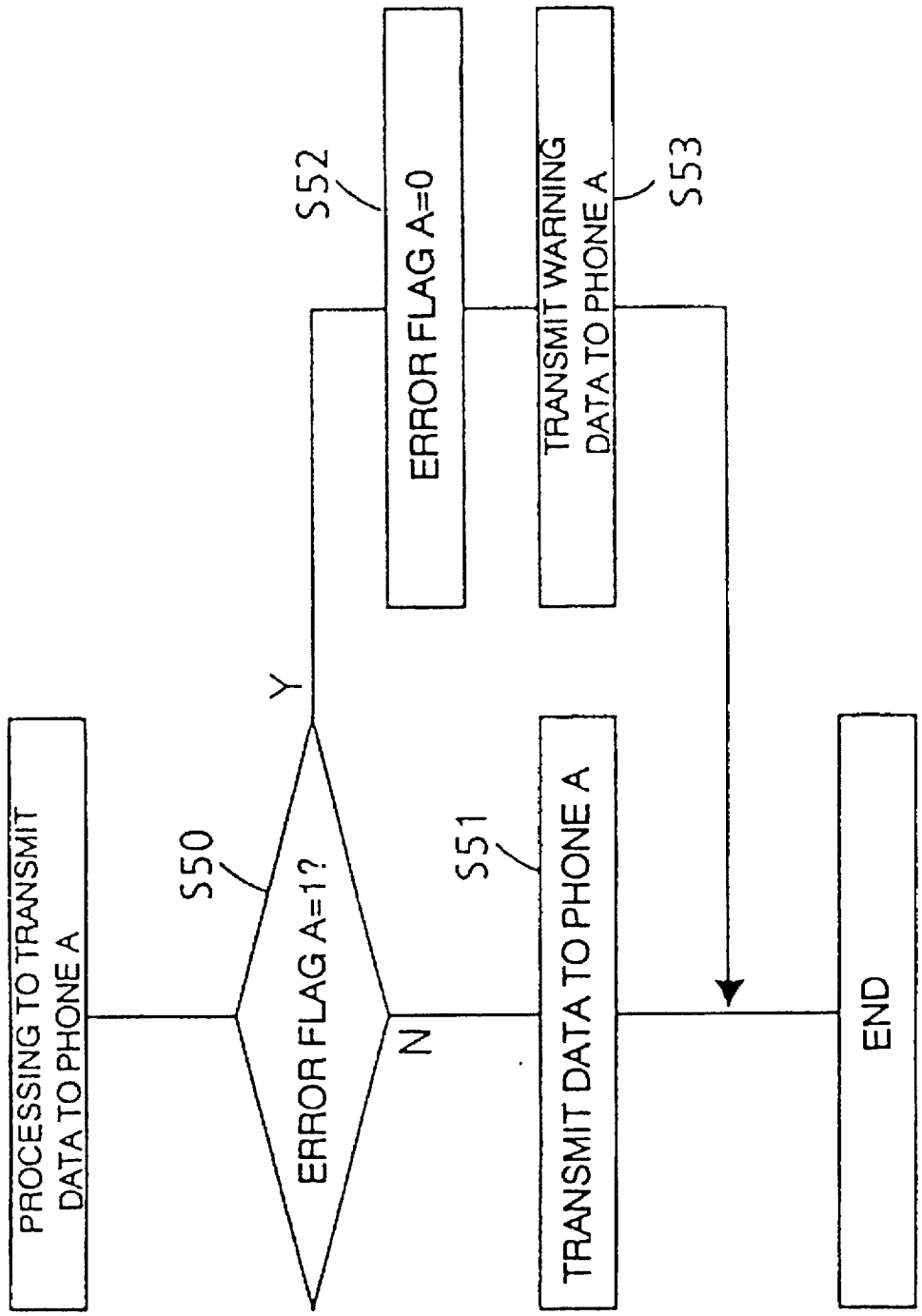
FIG. 23 is a flow chart of the processing of outgoing data sent from the digital telephone A as shown in FIGS. 21 and 22.

FIG. 23 is a flow chart showing the processing of data transmission to the telephone 2A (S06 and S30) shown in FIGS. 21 and 22. In FIG. 23, a data error flag A is checked (S50). If no error is found in the data, regular control information 1900 is transmitted to the telephone 2A (S51). If any error is found in the data, the data error flag is reset (S52), and warning data indicating the irregularity is sent to the telephone 2A. The telephone 2A, in receipt of the warning data, displays the content on the display 729A or produces an alarm sound indicating the irregularity through the speaker 721A.

Figure 24:
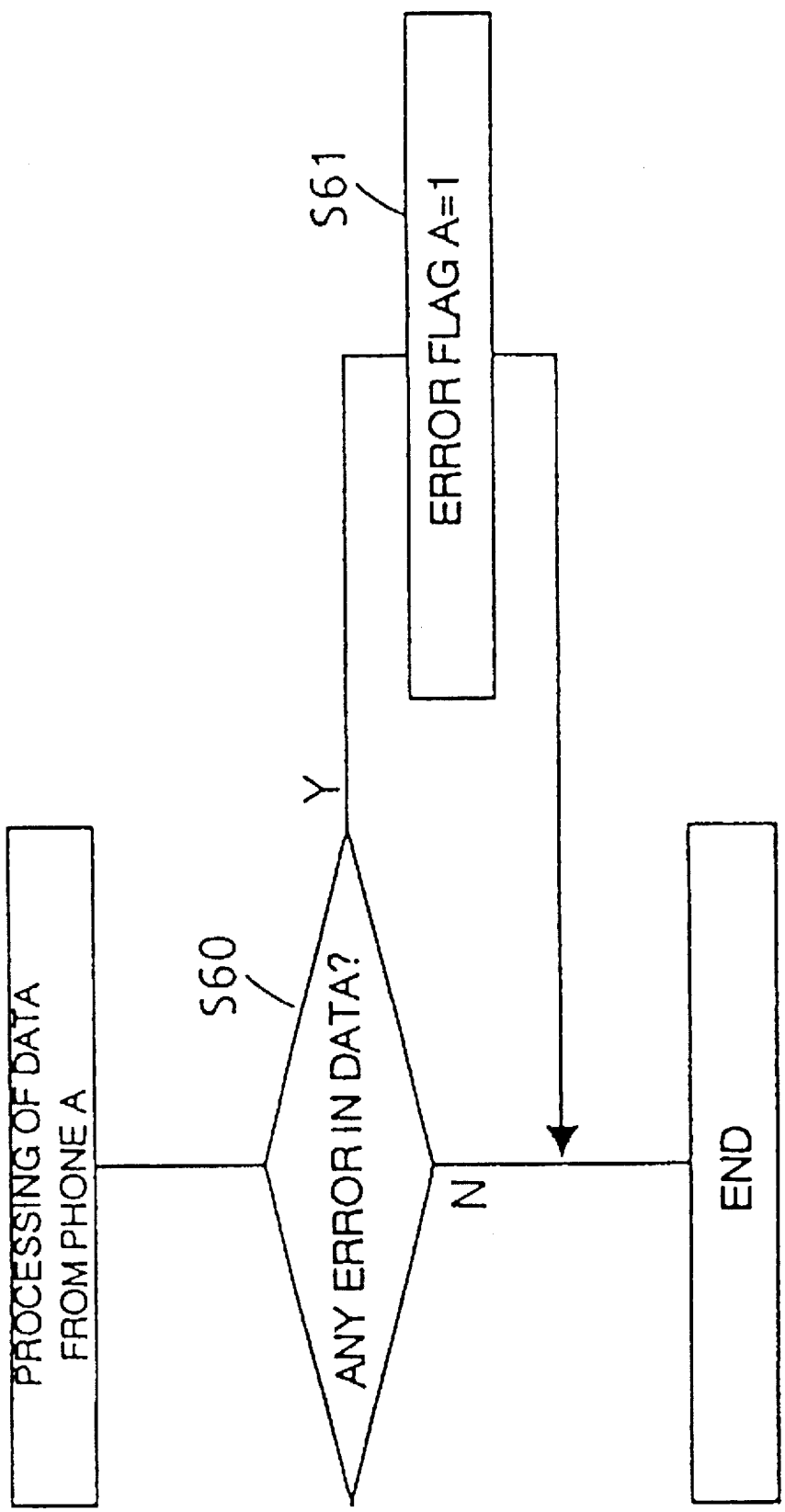
FIG. 24 is a flow chart of the processing of incoming data received from the digital telephone A as shown in FIGS. 21 and 22.

FIG. 24 is a flow chart showing the processing upon receipt of data from the telephone 2A (S14 and S35) shown in FIGS. 21 and 22. In FIG. 24, a data error flag A is checked (S60). If any error is found in the data, the data error flag A is reset (S61).

Figure 25:
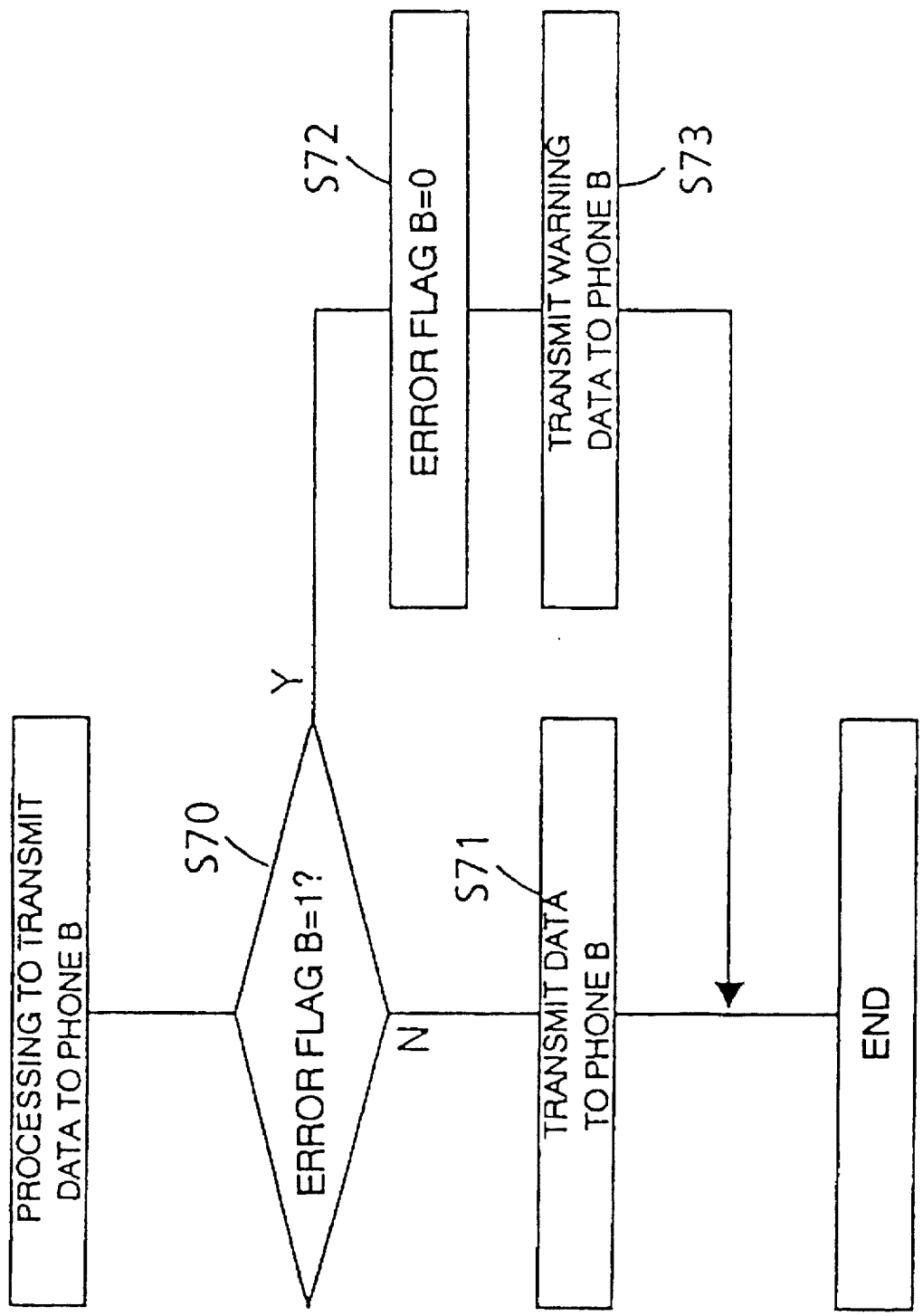
FIG. 25 is a flow chart of the processing of outgoing data sent from the digital telephone B as shown in FIGS. 21 and 22.

FIG. 25 is a flow chart showing the processing of data transmission to the telephone B (S19 and S41) shown in FIG. 21 and 22. In FIG. 25, a data error flag B is checked. If no data is found in the data, regular control information 1900 is transmitted to the telephone 2B (S71). If any error is found in the data, the data error flag B is reset (S72), and warning data indicating the irregularity is transmitted to the telephone 2B. In receipt of the warning data, the telephone 2B displays the content on the display 729B or produces an alarm sound indicating the irregularity through the speaker 721B.

Figure 26:
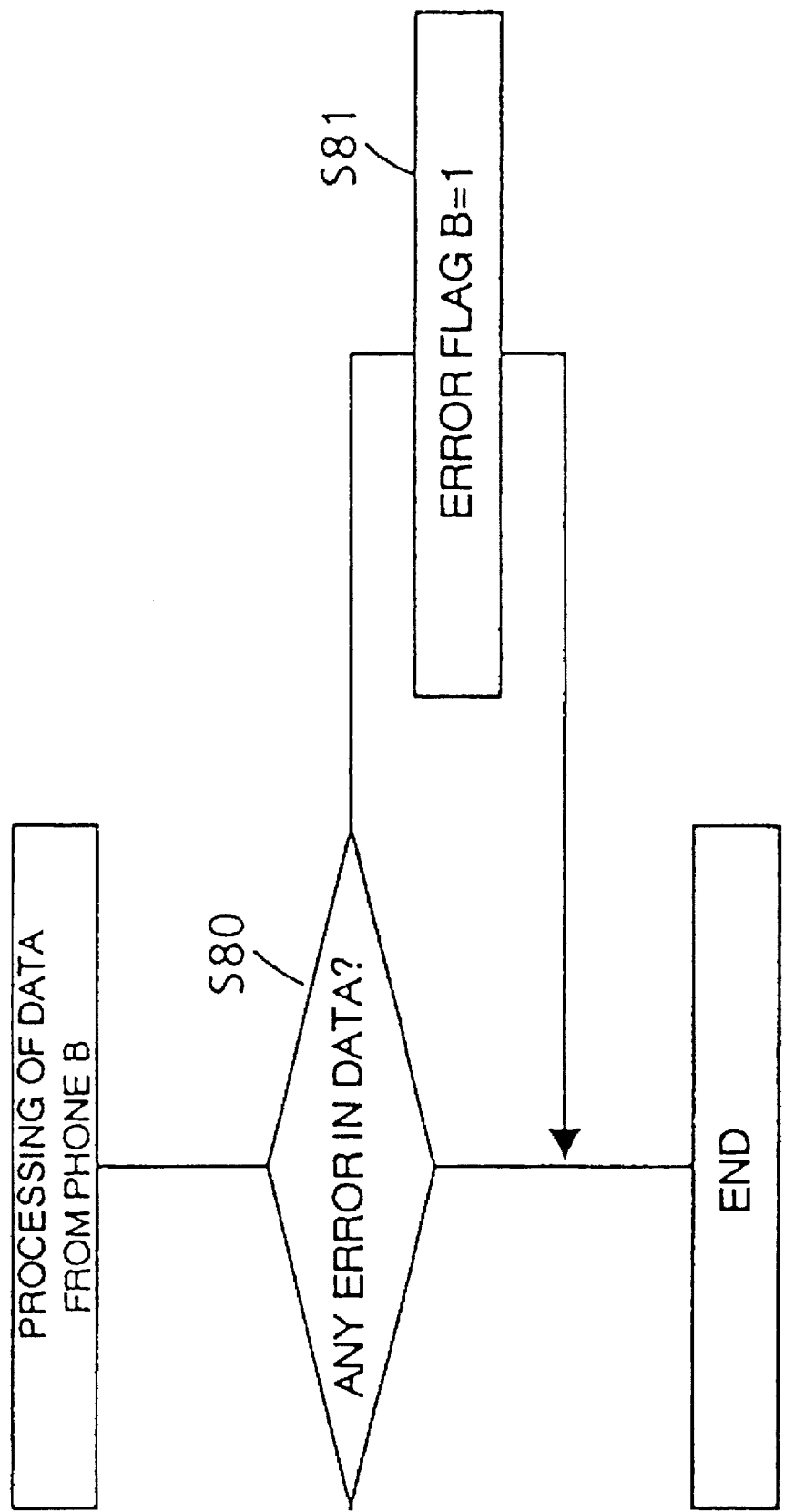
FIG. 26 is a flow chart of the processing of incoming data received from the digital telephone B as shown in FIGS. 21 and 22.

FIG. 26 is a flow chart showing the processing upon receipt of data from the telephone B (S24) shown in FIGS.

21 and 22. In FIG. 26, the received data is checked (S60). If any error is found in the data, the data error flag B is set (S81).

Figure 27:
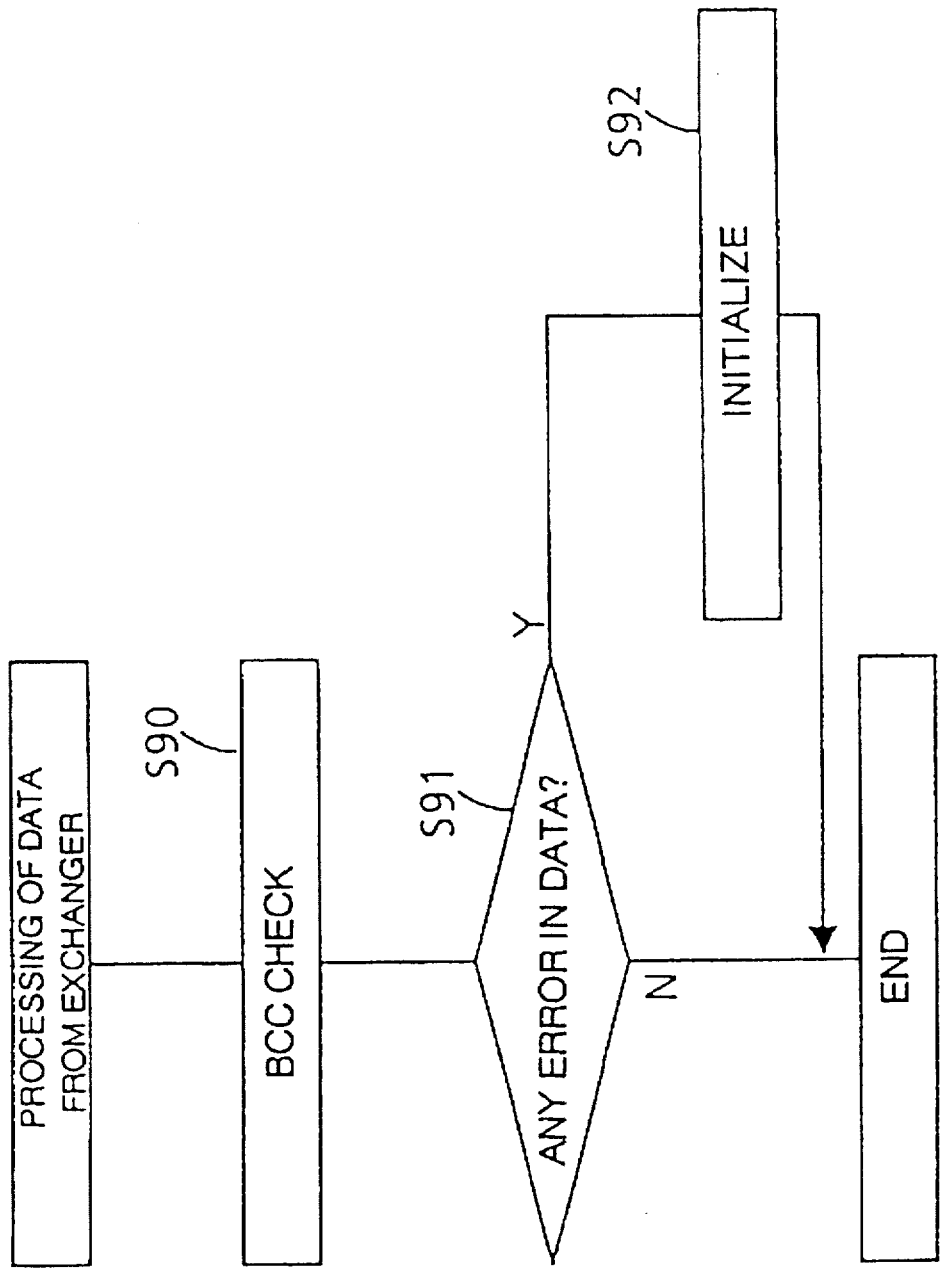
FIG. 27 is a flow chart of incoming data received from the branch exchanging system as shown in FIGS. 21 and 22.

FIG. 27 is a flow chart showing the processing upon receipt of data from the branch exchanger (S07, S08, S20, S31 and S20) shown in FIGS. 21 and 22. In FIG. 27, in receipt of control information from the digital extension circuit 11, BCC check is done (S90). If any error is found in the received data, the data transfer portions 711A, 711B are reset and initialized (S92).

Figures 28, 29:
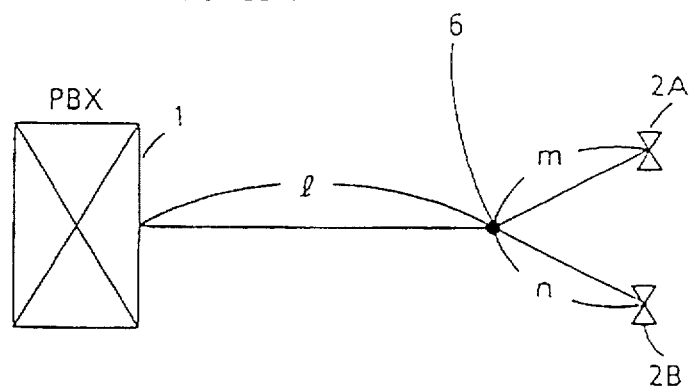
FIG. 28 is a block diagram explaining distances for transmitting data.
FIG. 29 is a diagram showing conditions of the length and the resistance of the transmission channel for a reliable operation thereof.

Next explained are distances for data transmission. FIG. 28 is a block diagram for explanation of distances for data transmission. Coupled to the digital line of PBX 1 are the digital telephones 2A, 2B in multiple connection. The length of the line from PBX 1 to the point of multiple connection 6 is expressed by 1, the length of the line from the point of multiple connection 6 to the telephone 2A by m, and the length of the line from the point of multiple connection 6 to the digital telephone 2B by n.

In this arrangement, it has been noted by an experiment that the sum of the lengths m and n (m+n) must be 50 m or less for ensuring accurate composition of a burst signal from the telephone 2A and a burst signal from the telephone 2B. This is because the transmission data adjusting circuit 708 has to refer to the polarity of a preceding pulse when supplying a next pulse. That is, a longer distance between the telephones 2A and 2B causes a delay in transmission of a next pulse and makes it difficult to cope with the bearer communication speed of 512 kbps.

FIG. 29 is a diagram showing conditions required between lengths and resistances of the transmission line for reliable behaviors of the system. In FIG. 29, the length 1 from PBX 1 and the point of multiple connection 6 should be such that the resistance thereof is 20 Ω or less (in case of a cable of 0.5 ø, 110 m or less), and the length m from the point of multiple connection 6 to the telephone 2A and the length n from the point of multiple connection 6 to the telephone 2B should be 10 m or less. Since these values were determined by deducting sufficient margins from the result of the experiment and a logical calculation, any PBX satisfying the conditions will reliably operate.

Explanation has been made by way of one example with two digital telephones in multiple connection with one digital line; however, three or more digital telephones may of course be coupled. The interface of the digital line is not limited to 2B+D, but may be a different arrangement such as B1+B2+B3+D (3B+D) or B1+B2+D1+D2 (2B+2D). If the interface has the arrangement of 2B+2D, time-divisional use of one D channel will not be necessary, and the processing will be easier.

In addition, although the embodiment connects digital telephones as terminal devices, some or all of them may be replaced with facsimile machines and/or image terminal devices.

Further, multiple connection of two or more digital telephones with one digital extension circuit is not necessary, and no problem will occur when only one digital telephone is connected.

According to the invention, a plurality of digital telephones can be directly connected with one digital line in multiple connection, and two or more of the digital telephones can concurrently make telephone calls with different destinations.

In addition, since a plurality of digital telephones can be connected to one digital extension circuit, the invention contributes to a reduction of digital extension circuits in a branch exchanging system and hence contributes to miniaturization of the branch exchanging system.

Further, multiple connection of a plurality of digital telephones with one digital line also facilitates wiring of telephone lines upon installment of a private telephone network.

What is claimed is:

1. A digital telephone switching system comprising:
   a main switching unit;
   at least a two-wire digital line extending from said main switching unit, and
   a plurality of terminal devices in direct multiple connection with said digital line;
   wherein the digital telephone switching system utilizes a ping-pong transmission system wherein a first burst signal transmitted to said plurality of terminal devices from said main switching unit, and a second burst signal transmitted from said plurality of terminal devices to said main switching unit, are transmitted mutually on said digital line;
   wherein said first burst signal and said second burst signal each comprises a plurality of communication information regions corresponding to each said plurality of terminal devices, said communication information region stores a call or data for communication between said main switching unit and said plurality of terminal devices;
   wherein said main switching unit comprises:
      a transmission means for transmitting said first burst signal to said plurality of terminal devices via said digital line at a predetermined timing; and
      a signal receiving means for receiving said second burst signal from said plurality of terminal devices on said digital line;
   wherein each of said plurality of terminal devices comprises:
      a setting means for designating at least one of a plurality of said communication information regions of said first burst signal and said second burst signal as an assigned communication information region to be used for communication between itself and said main switching unit;
      a signal receiving means for receiving said first burst signal from said main switching unit;
      a signal retrieving means for retrieving a call or data signal of a communication information region designated by said setting means to be used for the communication between the terminal device and said main switching unit when said signal receiving means receives said first burst signal;
      a generating means for providing a return call or data signal only to a designated said communication information region set by said setting means to be used for the communication between the terminal device and said main switching unit, so as to generate a partial transmission burst signal to be transmitted to said digital line; and
      a signal transmitting means for transmitting a generated said partial transmission burst signal from said generating means to said digital line at a state when said first burst signal does not exist on said digital line, and at a predetermined timing counting from a time said first burst signal was received at said signal receiving means;
   wherein each of said plurality of terminal devices transmits said partial transmission burst signal providing the call or data signal only at the communication information region to be used for the communication between itself and said main switching unit to said digital line at practically the same time after receiving said first burst signal from said main switching unit, such that said partial transmission burst signals transmitted from each of said plurality of terminal devices are combined on said digital line so as to form said second burst signal to be received by said main switching unit.

2. The digital telephone switching system of claim 1, wherein said first burst signal includes a control region for storing a control information for controlling said plurality of terminal devices; and wherein said main switching unit further comprises:
 a generating means for providing a control information for one of the plurality of terminal devices to said control region and generating said first burst signal;

wherein each of said terminal devices further comprises:
 a control means for distinguishing, upon receipt of said first burst signal, whether the control information stored in said control region of said first burst signal is the control information for said terminal device including said control means, and when it is distinguished to be the control information for said terminal device, controls said terminal device according to said control information.

3. The digital telephone switching system of claim 1, wherein said second burst signal is an AMI code signal; and wherein each of said plurality of terminal devices comprises:
 a memory means for latching temporarily a polarity information of a preceding pulse on said digital line; and
 a polarity deciding means for deciding a polarity of a subsequent pulse so that it differs from the polarity of the preceding pulse latched at said memory means;

wherein said transmission means transmits said transmission burst signal to said digital line based on an information of said polarity deciding means.

4. The digital telephone switching system of claim 1, wherein said first burst signal has a same number of control regions for storing a control information for controlling said plurality of terminal devices as said communication information region; and wherein said main switching unit comprises;
 a means for storing to each control regions a control information for each of said terminal devices.

5. A digital telephone switching system comprising:
a main switching unit;
a two-wire digital line system extending from said main switching unit, and
a plurality of terminal devices in direct multiple connection with at least one two-wire digital line of said two-wire digital line system;

wherein the digital telephone switching system utilizes a ping-pong transmission system wherein a first burst signal transmitted to said plurality of terminal devices from said main switching unit, and a second burst signal transmitted from said plurality of terminal devices to said main switching unit, are transmitted mutually on said digital line;

wherein said first burst signal and said second burst signal each comprises a plurality of communication information regions corresponding to each said plurality of terminal devices, said communication information region stores a call or data for communication between said main switching unit and said plurality of terminal devices;

wherein said main switching unit comprises:
 a transmission means for transmitting said first burst signal to said plurality of terminal devices via said two-wire digital line at a predetermined timing; and
 a signal receiving means for receiving said second burst signal from said plurality of terminal devices on said two-wire digital line;

wherein each of said plurality of terminal devices comprises:
 a setting means for designating at least one of a plurality of said communication information regions of said first burst signal and said second burst signal as an assigned communication information region to be used for communication between itself and said main switching unit;
 a signal receiving means for receiving said first burst signal from said main switching unit;
 a signal retrieving means for retrieving a call or data signal of a communication information region designated by said setting means to be used for the communication between the terminal device and said main switching unit when said signal receiving means receives said first burst signal;
 a generating means for providing a return call or data signal only to a designated said communication information region set by said setting means to be used for the communication between the terminal device and said main switching unit, so as to generate a partial transmission burst signal to be transmitted to said digital line; and
 a signal transmitting means for transmitting a generated said partial transmission burst signal from said generating means to said digital line at a state when said first burst signal does not exist on said digital line, and at a predetermined timing counting from a time said first burst signal was received at said signal receiving means;

wherein each of said plurality of terminal devices transmits said partial transmission burst signal providing the call or data signal only at the communication information region to be used for the communication between itself and said main switching unit to said digital line at substantially a same time after receiving said first burst signal from said main switching unit, such that said partial transmission burst signals transmitted from each of said plurality of terminal devices are overlapped and combined on said digital line so as to form said second burst signal to be received by said main switching unit.

6. The digital telephone switching system of claim 5, wherein said first burst signal includes a control region for storing a control information for controlling said plurality of terminal devices; and wherein said main switching unit further comprises:
 a generating means for providing a control information for one of the plurality of terminal devices to said control region and generating said first burst signal;

wherein each of said terminal devices further comprises:
 a control means for distinguishing, upon receipt of said first burst signal, whether the control information stored in said control region of said first burst signal is the control information for said terminal device including said control means, and when it is distinguished to be the control information for said terminal device, controls said terminal device according to said control information.

7. The digital telephone switching system of claim 5, wherein said second burst signal is an AMI code signal; and wherein each of said plurality of terminal devices comprises:
- a memory means for latching temporarily a polarity information of a preceding pulse on said digital line; and
- a polarity deciding means for deciding a polarity of a subsequent pulse so that it differs from the polarity of the preceding pulse latched at said memory means;

wherein said transmission means transmits said transmission burst-signal to said digital line based on an information of said polarity deciding means.

8. The digital telephone switching system of claim 5, wherein said first burst signal has a same number of control regions for storing a control information for controlling said plurality of terminal devices as said communication information region; and wherein said main switching unit comprises;
- a means for storing to each control regions a control information for each of said terminal devices.

* * * * *